US007646425B2

(12) United States Patent
Bohaker et al.

(10) Patent No.: US 7,646,425 B2
(45) Date of Patent: Jan. 12, 2010

(54) MULTIFUNCTION ALL IN ONE CAPTURE STATION FOR CREATING IDENTIFICATION DOCUMENTS

(75) Inventors: David Bohaker, Chelmsford, MA (US); Charles F. Duggan, Merrimack, NH (US); Leo M. Kenen, Bedford, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 403 days.

(21) Appl. No.: 11/112,965

(22) Filed: Apr. 22, 2005

(65) Prior Publication Data

US 2005/0243199 A1    Nov. 3, 2005

Related U.S. Application Data

(63) Continuation-in-part of application No. PCT/US2004/032699, filed on Sep. 30, 2004, and a continuation-in-part of application No. 10/676,362, filed on Sep. 30, 2003, now abandoned, and a continuation-in-part of application No. 10/663,439, filed on Sep. 15, 2003, now abandoned.

(60) Provisional application No. 60/564,820, filed on Apr. 22, 2004.

(51) Int. Cl.
*H04N 5/225* (2006.01)
*H04N 5/232* (2006.01)
*H04N 7/18* (2006.01)
*G06K 9/00* (2006.01)
*G03B 17/00* (2006.01)

(52) U.S. Cl. ............... 348/373; 348/78; 348/156; 348/211.14; 382/115; 396/428

(58) Field of Classification Search .......... 348/14.07, 348/14.13, 78, 80, 143, 150, 156, 158, 207.1, 348/207.11, 211.14, 373, 375, 376; 382/115; 396/428, 425

See application file for complete search history.

(56) References Cited

U.S. PATENT DOCUMENTS 2,932,478 A * 4/1960 Krieger .................. 396/428

(Continued)

FOREIGN PATENT DOCUMENTS

JP       2000292834 A * 10/2000

(Continued)

OTHER PUBLICATIONS

Datacard Group Secure ID and Card Personalization Solutions, "Personal-Grace Capture for High-Volume Environments" (2007)(2 pages).

(Continued)

*Primary Examiner*—John M Villecco
(74) *Attorney, Agent, or Firm*—Mintz, Levin, Cohn, Ferris, Glovsky and Popeo, P.C.

(57) ABSTRACT

A capture station for creating identification documents comprises a housing including a camera and lighting device, a base, and at least one leg extending from the base. The housing is mounted to the leg to enable height adjustment of the camera. One configuration of the capture station has two substantially rigid and parallel legs with the housing mounted between the legs. Configurations of the capture station can include a processor, such a CPU or embedded controller, enabling ID document data capture functions to be executed within the capture station, and to be controlled via a remote computer via a network connection. In one embodiment, the processor is housed in the base and communicates with the camera via wiring routed through the leg. Peripherals used in capture functions, such as a fingerprint reader, signature pad, display, etc., may be mounted to the leg via clamps, or a plug in receptacle with power and communication wiring provided in the leg.

17 Claims, 34 Drawing Sheets

U.S. PATENT DOCUMENTS

| | | | | |
|---|---|---|---|---|
| 3,586,278 | A * | 6/1971 | Simons | 396/428 |
| 3,687,030 | A * | 8/1972 | Dine et al. | 396/428 |
| 3,737,226 | A * | 6/1973 | Shank | 355/67 |
| 3,816,842 | A * | 6/1974 | Glaros et al. | 396/396 |
| 4,248,510 | A * | 2/1981 | Baker et al. | 396/332 |
| 4,474,439 | A * | 10/1984 | Brown | 352/243 |
| 4,597,655 | A * | 7/1986 | Mann | 396/336 |
| 4,741,042 | A | 4/1988 | Throop et al. | 382/1 |
| 4,915,237 | A | 4/1990 | Chang et al. | 209/524 |
| 6,038,012 | A * | 3/2000 | Bley | 355/40 |
| 6,094,545 | A * | 7/2000 | Petitjean | 396/544 |
| 6,381,415 | B1 | 4/2002 | Terada | 396/176 |
| 6,466,982 | B1 | 10/2002 | Ruberg | 709/227 |
| 6,483,993 | B1 * | 11/2002 | Misumi et al. | 396/78 |
| 6,709,172 | B2 * | 3/2004 | Brown | 396/428 |
| 6,752,432 | B1 | 6/2004 | Richardson | 283/91 |
| 6,817,530 | B2 | 11/2004 | Labrec et al. | 235/487 |
| 6,923,378 | B2 | 8/2005 | Jones et al. | 235/488 |
| 6,944,773 | B1 | 9/2005 | Abrahams | 713/201 |
| 7,063,264 | B2 | 6/2006 | Bi et al. | 235/487 |
| 2002/0170966 | A1 | 11/2002 | Hannigan et al. | 235/462.01 |
| 2002/0191082 | A1 * | 12/2002 | Fujino et al. | 348/211.14 |
| 2003/0234286 | A1 | 12/2003 | Labrec et al. | 235/380 |
| 2003/0234292 | A1 | 12/2003 | Jones | 235/491 |
| 2004/0017490 | A1 | 1/2004 | Lin | 348/231.99 |
| 2004/0099731 | A1 | 5/2004 | Olenick et al. | 235/380 |
| 2006/0213996 | A1 * | 9/2006 | Crucs | 235/462.13 |
| 2008/0226284 | A1 * | 9/2008 | Coppola | 396/428 |

FOREIGN PATENT DOCUMENTS

| | | | |
|---|---|---|---|
| JP | 2004201331 A | * | 7/2004 |
| JP | 2004309647 A | * | 11/2004 |

OTHER PUBLICATIONS

Datacard Group Secure ID and Card Personalization Solutions, "Datacard® SecureCapture™ Solution" (retrieved Jun. 20, 2007) retrieved from internet: <URL:http://www.datacard.com/products/products.jtml?category=Specifications&contentID=7137795BRYviYFIF.

Axis Communication, "What is a network camera?", http://www.axis.com/products/camera_ servers/nwcamera.htm, 10 pgs. (2002).

Digimarc IDSystmes, Schweitzer, Bruce (author); "Capture Station Design" version 1.2, 18 pgs. (2003).

"Capture Station Architecture Document", 33 pgs.

"Invisible Ink Marks From Xerox", File://C:Documents%20and%20Settings\MDowning\Local%20Settings\Temporary%20Int . . . 3 pgs., (2002).

* cited by examiner

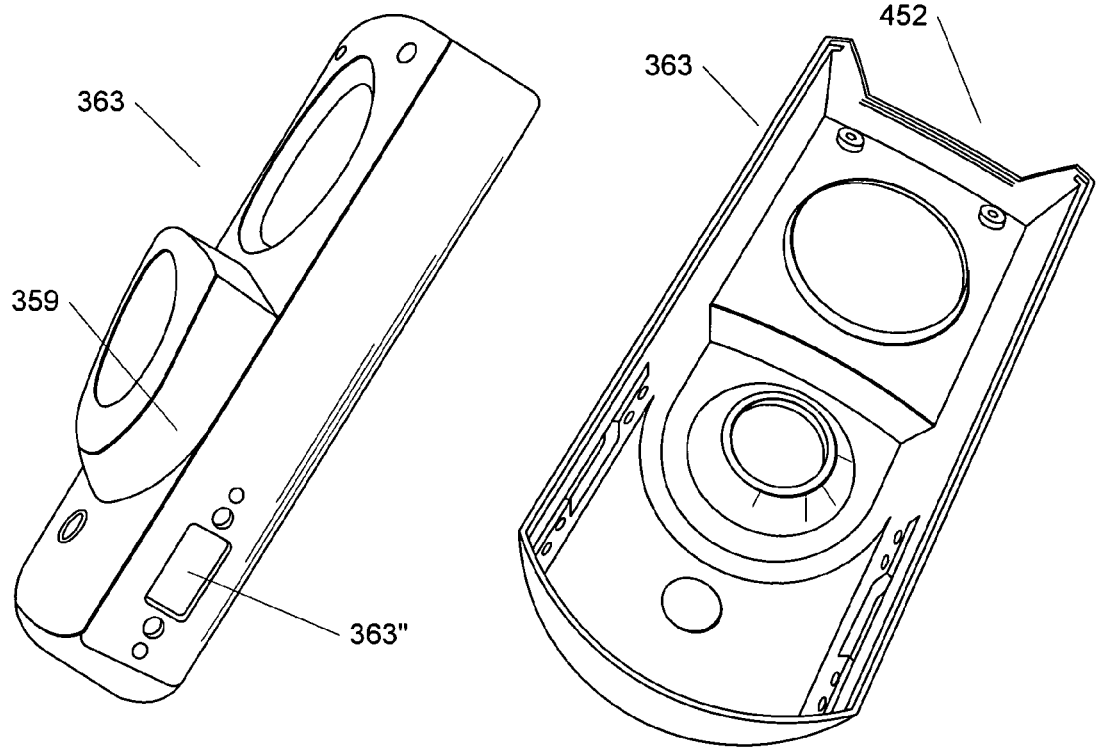
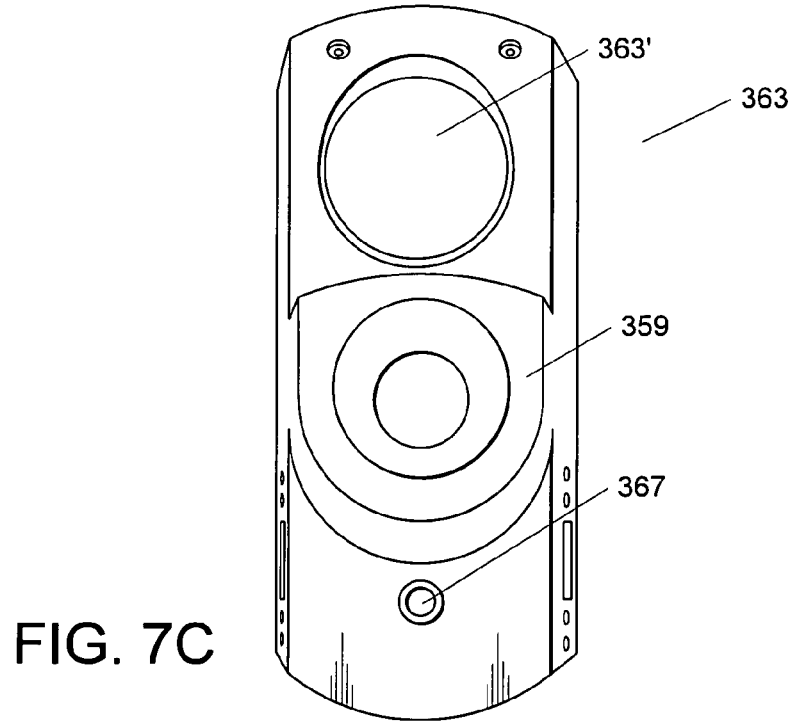
FIG. 7A  FIG. 7B
FIG. 7C

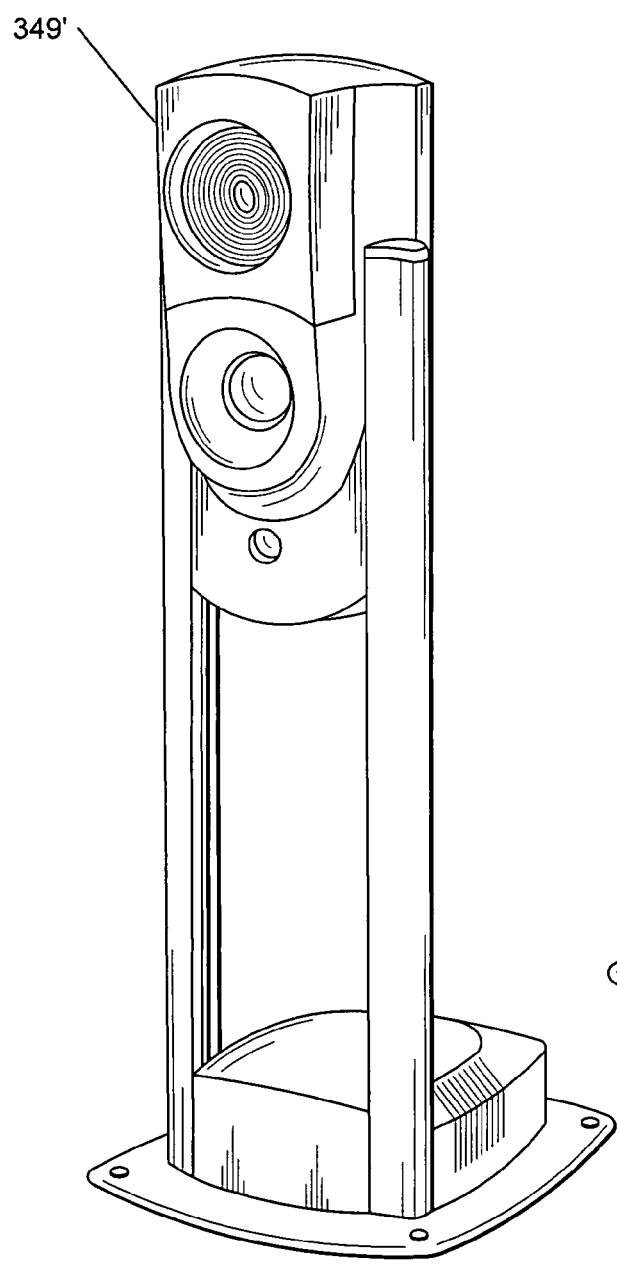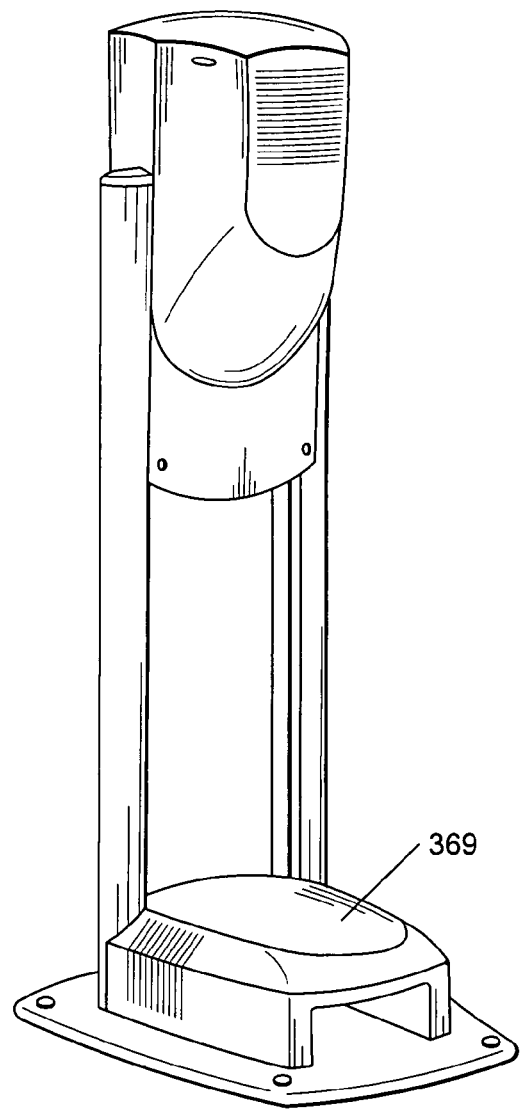
FIG. 13A
FIG. 13B

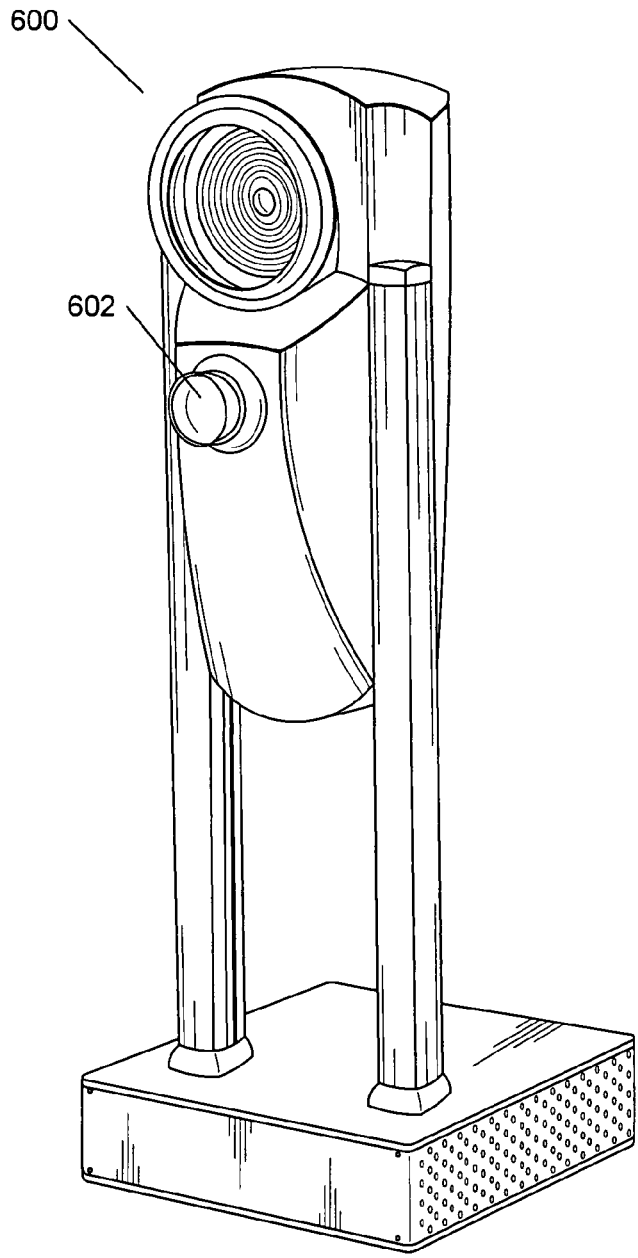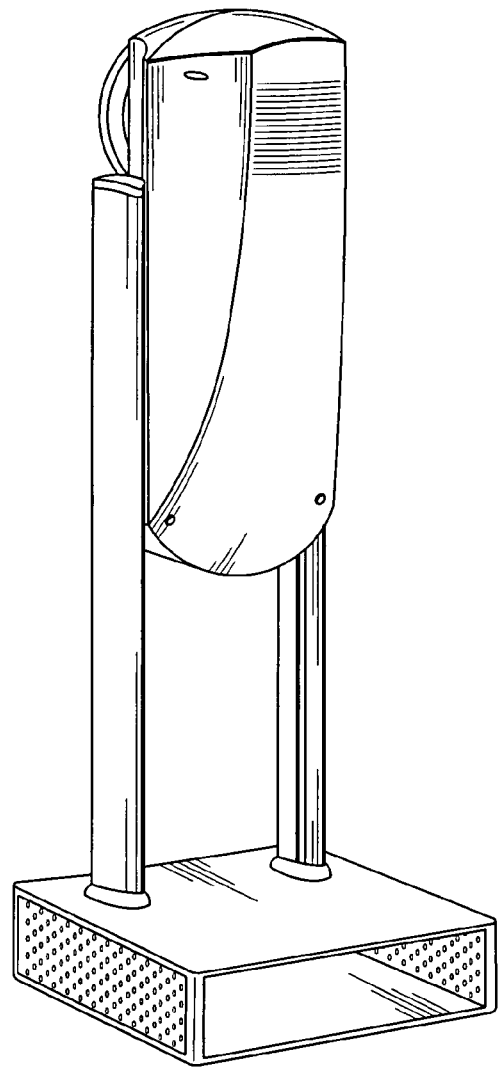
FIG. 20A
FIG. 20B

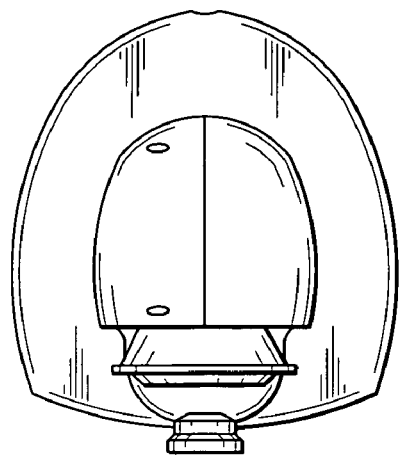
FIG. 22C
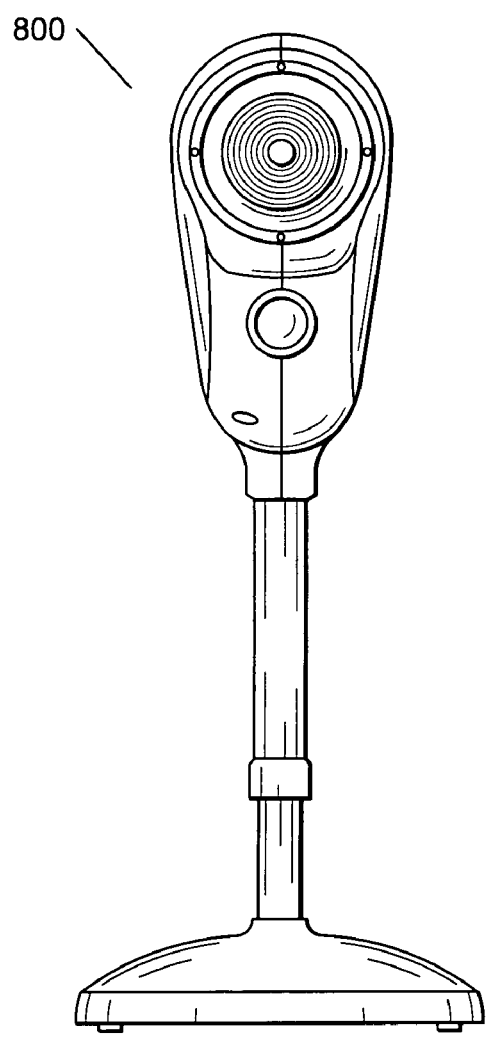
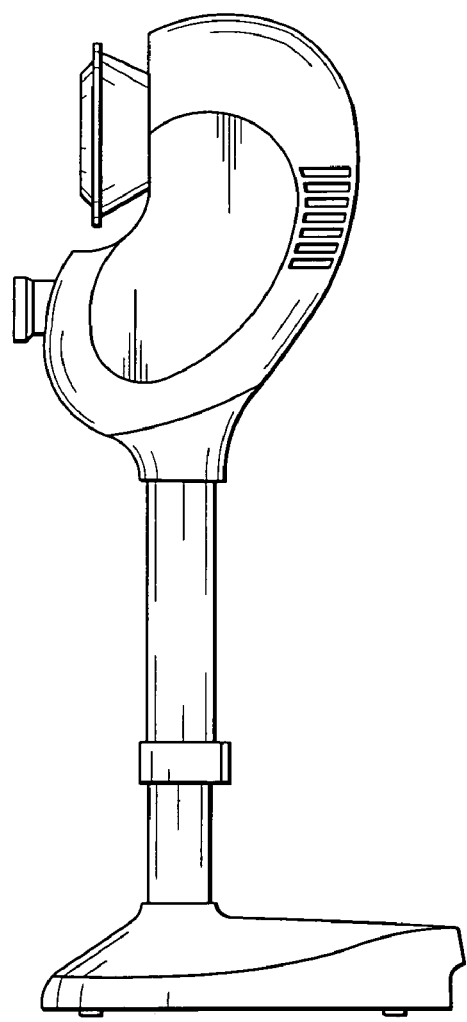
FIG. 22A
FIG. 22B

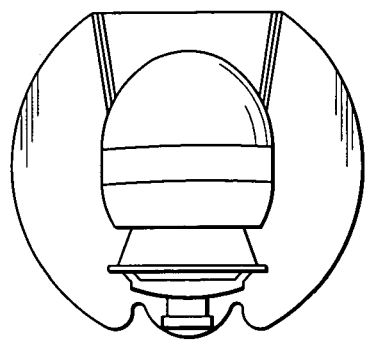
FIG. 24C
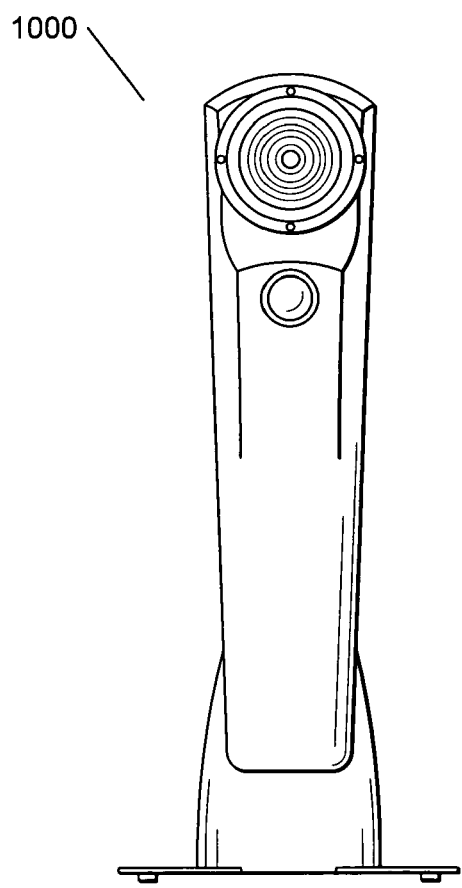
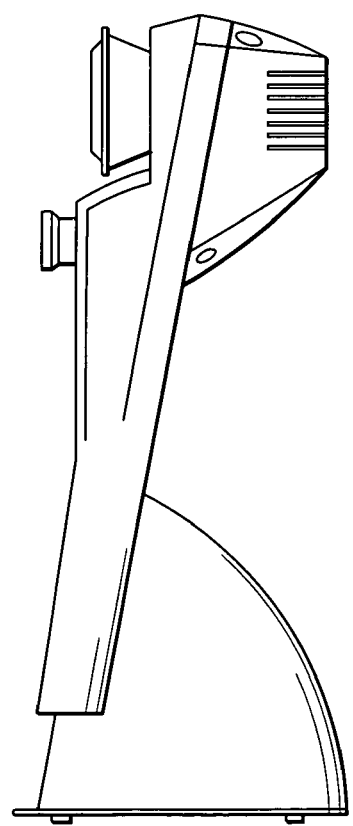
FIG. 24A
FIG. 24B

MULTIFUNCTION ALL IN ONE CAPTURE STATION FOR CREATING IDENTIFICATION DOCUMENTS

RELATED APPLICATION DATA

This application claims priority from U.S. Provisional Application 60/564,820 filed Apr. 22, 2004.

This application is also a continuation in part of the following U.S. patent applications:
- U.S. application Ser. No. 10/676,362, filed Sep. 30, 2003 (U.S. Patent Publication 20050068420);
- U.S. application Ser. No. 10/663,439, filed Sep. 15, 2003 (U.S. Patent Publication 20040140459; and
- PCT Application No. PCT/US2004/032699, filed Sep. 30, 2004 (PCT Publication WO 2005/034012.

Each of the above U.S. patent documents is herein incorporated by reference in its entirety

TECHNICAL FIELD

The invention relates to a capture station and related systems and methods for capturing information used for creating identification documents. This invention also relates to a configurable capture station structure that integrates together a computer with one or more components, such as cameras, signature pads, fingerprint scanners, etc., used to capture information to be printed to identification documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. (For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

Identification documents, such as ID cards, having printed background security patterns, designs or logos or identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

As those skilled in the art know, ID documents such as drivers licenses can contain information such as a photographic image of the bearer, variable personal information, such as an address, signature, and/or birthdate, and biometric information associated with the person whose image appears in the photographic image (e.g., a fingerprint), a magnetic stripe (which, for example, can be on the a side of the ID document that is opposite the side with the photographic image). This information needs to be acquired from the individual, such as by taking the individual's picture, asking the individual to provide a signature, scanning the individual's fingerprint, and the like.

Systems for production of identification documents often include separate functional subsystems or components for completing the transaction. Examples of these functions and associated components can include:

(a) capturing personalized information (e.g., cameras for photographic images, scanners, readers, and/or cameras for biometric data, electronic signature pads for signatures, etc):

(b) entering information (e.g., keyboards and/or pointing devices for entering name and address, etc.):

(c) processing the transaction (e.g., point of sale (POS) devices, credit card readers, receipt printers, etc);

(d) and producing a permanent or temporary identification document (e.g., printers to produce temporary paper identification documents, so-called "over the counter" or on the spot identification document printers and/or laminators, and so-called "central issue" and other large scale identification printing systems;

(e) storing the captured information for future retrieval and/or providing to external sources (e.g., memory systems, image storage systems, etc.); and (f) performing all processing, device control, communications, and other operations (both automated and manual) necessary to perform functions (a) through (e=d), e.g. via a computer, such as a standalone computer system.

Systems performing the above functions can be configured in many different ways, but commonly the various components are separate entities, (not provided as part of the same integrated package or housing), arranged separately in an applicant processing area and manually coupled together via connection and/or communication cables. This type of capture configuration is more difficult to transport and configure in an office setting and is more costly because it involves multiple physically separate machines or devices. In addition, the separate devices often take up a significant amount of physical space in what often is a space constrained environment. This arrangement also presents challenges in sharing the capture station among more than one station operator, adding cost and inconvenience.

In one approach to enable sharing of the camera assembly, the workstation that controls the camera assembly may be connected to other workstations in a computer network. This network configuration enables the other workstations to issue image capture and transfer commands to the workstation directly connected to the capture stand. However, this configuration presents more costs and challenges because all capture control commands and associated data flow from a source workstation to a destination workstation connected to the camera assembly, and the destination workstation may not always be available. A typical problem is where the destination workstation is not logged on due to the absence of office personnel responsible for that station. In this case, the workstation is not able to process requests for image capture and transfer from other workstations.

In addition, this configuration requires at least three machines to operate in a networked environment: two workstations and a separate camera assembly.

Another limitation of known systems for capturing images is that such systems can be awkward to adjust to accommodate photographing subjects of varying heights. Some known systems couple the camera directly to a computer monitor, limiting the range of motion and adjustment of the camera. Some known systems use conventional camera stands such as tripods, which permit more adjustment of where the camera is to be pointed. Conventional tripods generally include a head to which a camera is mountable and a series of three telescoping legs that support the head and can fold together when not in use.

Use of conventional tripods can be inconvenient and awkward in some types of environments, however, such as locations for taking images used in identification documents. One problem is that such locations are often space limited and tripods can be bulky and space-consuming. Another problem is that it can be difficult and time-consuming for an operator to adjust all three legs of the conventional tripod quickly and easily to the proper length needed to mount the camera at a desired elevation, which elevation may change with each person being photographed. Stability and balance of the tripod can also be an issue, especially since the legs each must be at approximately the same length. Another issue is theft prevention: because it is not simple or even desirable to rigidly mount a tripod and camera in a fixed location, the tripod and camera may have to be disassembled and reassembled with each days use, including connections to computers, printers, etc., which is time-consuming, prone to error, and prone to accidental damage of the equipment.

One type of known device that addresses some of these issues is a so-called "camera tower" capture station. FIG. 1 illustrates such a camera tower type of capture station 10, which is available from the assignee of the present invention. (note that at least some elements of the capture station of FIG. 1 as described herein may have application in the new embodiments of the new multifunction capture station that are described further herein). The capture station 10 of FIG. 1 includes an image capture device 12, such as a video camera and lens, a light sensor 14, and a light source 16.

During operation, the capture station 10 is controlled by a computer. In a commonly assigned patent application entitled "All in One Capture Station for Creating Identification Documents," Ser. No. 10/676,362, filed Sep. 30, 2003 (hereinafter "All In One Application"), which is hereby incorporated by reference, a capture station is described that includes a computer that can be built in to the capture station 10 or provided separately and operably coupled to the capture station 10, to provide light directed toward a subject (e.g., an applicant for an identification document) and to capture a digital image of the subject. Together, the light sensor 14, and a light source 16 operate as a lighting device. An exit aperture plane can be defined to include the surface of the light source 16 through which the light is directed. The image capture device 12 has an observation axis 18 that is orthogonal to the exit aperture plane of the light source 16. In one embodiment, the light sensor 14 is provided by a strobe sensor, and the light source 16 is an electronic strobe. The light sensor 14 provides a real time adjustment to the light source 16 illumination of the subject by sampling light reflected off the subject and directed back to the light sensor 14. The strobe can optionally include a diffuser cover.

The capture station 10 includes a top portion 11 slidably engaged with a bottom portion 13, enabling the top portion 11 to be slid into and out of the bottom portion 13, enabling the height of the observation axis 18 to be changed (e.g., to accommodate subjects of varying heights). A locking mechanism (not shown), is provided to ensure that the desired orientation of the top and bottom portions 11, 13, respectively, can be maintained. Such a locking mechanism is presumed to be known to those of skill in the art and is not described further here.

As explained in the All In One Application, the capture station 10 of FIG. 1 can be provided with a lighting device 200, as shown in the capture station 10' FIG. 2. As described in a commonly assigned patent application entitled "Enhanced Shadow Reduction System and Related Techniques for Digital Image Capture," Ser. No. 10/663,439, filed Sep. 15, 2003 (hereinafter "Shadow Reduction Application"), which is hereby incorporated by reference, the lighting device 200 can be used to help reduce shadows in subjects whose images are being captured using the capture station 10'. The lighting device 200 includes a housing 210 which includes diffusely reflective inner surfaces 214a and 214b coupled to diffusely reflective end portions 218a and 218b, respectively. The lighting device 200 further includes a diffuser 220 disposed on the housing 210. A reflector 222 is not visible in FIG. 1, but the reflector 222 and additional details about the lighting device 200 are described more fully in the Shadow Reduction Application.

As described in the Shadow Reduction Application, at least some embodiments of the lighting device 200 are adapted to mount directly onto the capture station 10 without requiring any changes to the workstation control software and hardware and without modification to the image capture device 12, the light sensor 14, and the light source 16. The image capture device 12 has an observation axis 18 which is generally aligned with light reflected from the inner surfaces 214a and 214b directed onto the subject. It will be appreciated by those of ordinary skill in the art that image capture device 12 may include, but is not limited to, a video camera and associated frame or field capture device, a digital camera, or a CCD or CMOS image sensor. The image capture device 12 is coupled to a built in computer (described below) by means of a video signal interface or a digital interface.

During use, the computer to which capture station 10 of FIGS. 1 and 2 is connected can also be operably coupled to other devices (e.g., peripherals), to acquire additional information as part of the process of creation and issuance of the identification document. Such devices, although not illustrated in FIG. 1, are known in the art and include devices such as fingerprint readers, signature capture devices, scanners, etc.

The lighting device 200 and capture stand 10 housing of FIG. 1 can be formed using virtually any material and/or combination of materials, so long as the resultant device is capable of functioning in the manner described. Additional considerations such as weight, electrical shielding, environmental conditions, etc., also can impact selection of an appropriate material. We have made a capture stand housing 10 using, for example, substantially rigid plastic materials, such as PC and ABS. Housing 210 of the illustrated lighting device 200 of FIG. 1 was formed using a plastic material, and the diffusively reflective surfaces (214*a*, 214*b*, 218*a*, 218*b*) within it were created by coating the surfaces with a light colored paint.

Those skilled in the art will appreciate, however, that the capture station 10, housing 210 and/or the diffuser 220 can be formed using virtually any type of material capable of being formed into the desired shape and (in the case of the diffuser) providing the desired optical properties, including but not limited to metal, cardboard, glass, fabric, paper, wood, paperboard, ceramic, rubber, along with many man-made materials, such as microporous materials, single phase materials, two phase materials, coated paper, synthetic paper (e.g., TYVEC, manufactured by Dupont Corp of Wilmington, Del.), ABS, polycarbonate, polyolefin, polyester, polyethylenetelphthalate (PET), PET-G, PET-F, and polyvinyl chloride (PVC), and combinations thereof. In one experiment, we found that a satisfactory housing 210 could even be formed using a section of six (6) inch diameter white plastic plumbing pipe. Many different methods of forming the capture station 10, diffuser 220, and housing 210 are usable, including milling, injection molding, stamping, welding, coupling several individual elements together using adhesive, screws, staples, etc.

Although the capture station 10 of FIG. 1 meets at least some of the needs of users, it would be desirable to further reduce the footprint of the capture station 10 and, if possible, combine the capture station with a computer and include with (or couple to) the capture station one or more other devices for acquiring information about a subject. It also would be desirable to provide a capture station that is simple to set up and use, and which is readily configurable based on the end user's needs. It would be advantageous if a capture station could be provided that can help to minimize the problems associated with hanging wires and connections. It also would be desirable to have a capture station with a streamlined, contemporary, and aesthetically pleasing appearance, which can be simpler to install, upgrade, and maintain than some current installations.

In one embodiment, the invention provides a configurable all in one capture station and related methods, system and software for creating identification documents. One aspect of the invention is the configurable all in one capture station, which combines the functions of a camera assembly, lighting system, and workstation into a single configurable device. This device can be operated in a shared mode where it is controlled via one or more other workstations, or a stand alone mode, where it performs all of the functions needed to prepare information for printing to an identification document. The configurable all in one capture station, in one embodiment, includes a housing that combines a camera stand, a camera mounted within the camera stand, lighting system mounted within the camera stand, enclosures for cables and wires, and a computer integrated into the camera stand. The computer includes a processor, network interface device, and memory. The memory stores a camera control program and a network interface program for transferring camera control commands and image data between the capture station and a remote workstation so that the capture station can operate under the control of the remote workstation to capture data for incorporation into an identification document.

In another embodiment, the invention provides an all in one capture station that includes a camera stand, camera mounted within the camera stand, an integrated lighting system, and an optional computer integrated into the camera stand. The camera stand has one or more elongated support members to which additional optional capture elements (e.g., a signature pad) can be fixedly coupled. In at least one embodiment, the elongated support members are constructed and arranged so that connections (e.g., cables) between the camera, computer, and/or the additional capture element(s) can be routed through the elongated members. This embodiment of the all in one capture station can provide a number of functional, operational, aesthetic, and/or economic advantages, including:

(a) simplification of setup and connection of the capture station elements;

(b) reduced capture station footprint;

(c) ability to quickly and easily customize features of the capture station; and (d) simplified repair, replacement, and upgrading of capture station elements;

Another aspect of the invention is a capture station for creating identification documents comprising a housing including a camera and lighting device, a base, and at least one leg extending from the base, the housing being adjustably mounted to the at least one leg to enable height adjustment of the camera. One configuration of the capture station has two substantially rigid and parallel legs with the housing mounted between the legs. The housing is mounted to be adjustable to a desired height above the base. Configurations of the capture station can include a processor, such as a networked processor enabling capture functions to be executed within the capture station, and to be controlled via a remote computer via a network connection. In one embodiment, the processor is housed in the base and communicates with the camera via wiring routed through a leg. Peripherals used in capture functions, such as a fingerprint reader, signature pad, display, etc., may be mounted to the leg via clamps, or a plug in receptacle with power and communication wiring provided in the leg.

The foregoing and other objects, aspects, features, and advantages of this invention will become even more apparent from the following description and drawings, and from the claims.

The foregoing and other features and advantages of the present invention will be even more readily apparent from the following Detailed Description, which proceeds with reference to the accompanying drawings.

BRIEF DESCRIPTION OF THE DRAWINGS

The foregoing advantages, features, and aspects of embodiments of the invention, as well as the invention itself, will be more fully understood in conjunction with the following detailed description and accompanying drawings, in which:

FIG. 7A is a right side perspective view of the front panel of the capture station of FIG. 3A;

FIG. 7B is a bottom rear perspective view of the front panel of the capture station of FIG. 3A;

FIG. 7C is a front elevational view of the front panel of the capture station of FIG. 3A;

FIGS. 13A and 13B are front and back perspective views, respectively, of a capture station in accordance with a third embodiment of the invention;

FIGS. 17A and 1B are front and rear perspective views, respectively of a first capture station with a shadow reduction system, in accordance with a third embodiment of the invention;

FIGS. 20A and 20B are front and back perspective views, respectively, of a capture station in accordance with a sixth embodiment of the invention;

FIG. 22A-22C are front, side, and top views, respectively, of an eighth embodiment of the invention;

FIGS. 24A-24C are front, side, and top views, respectively, of a tenth embodiment of the invention;

Figure 1A:
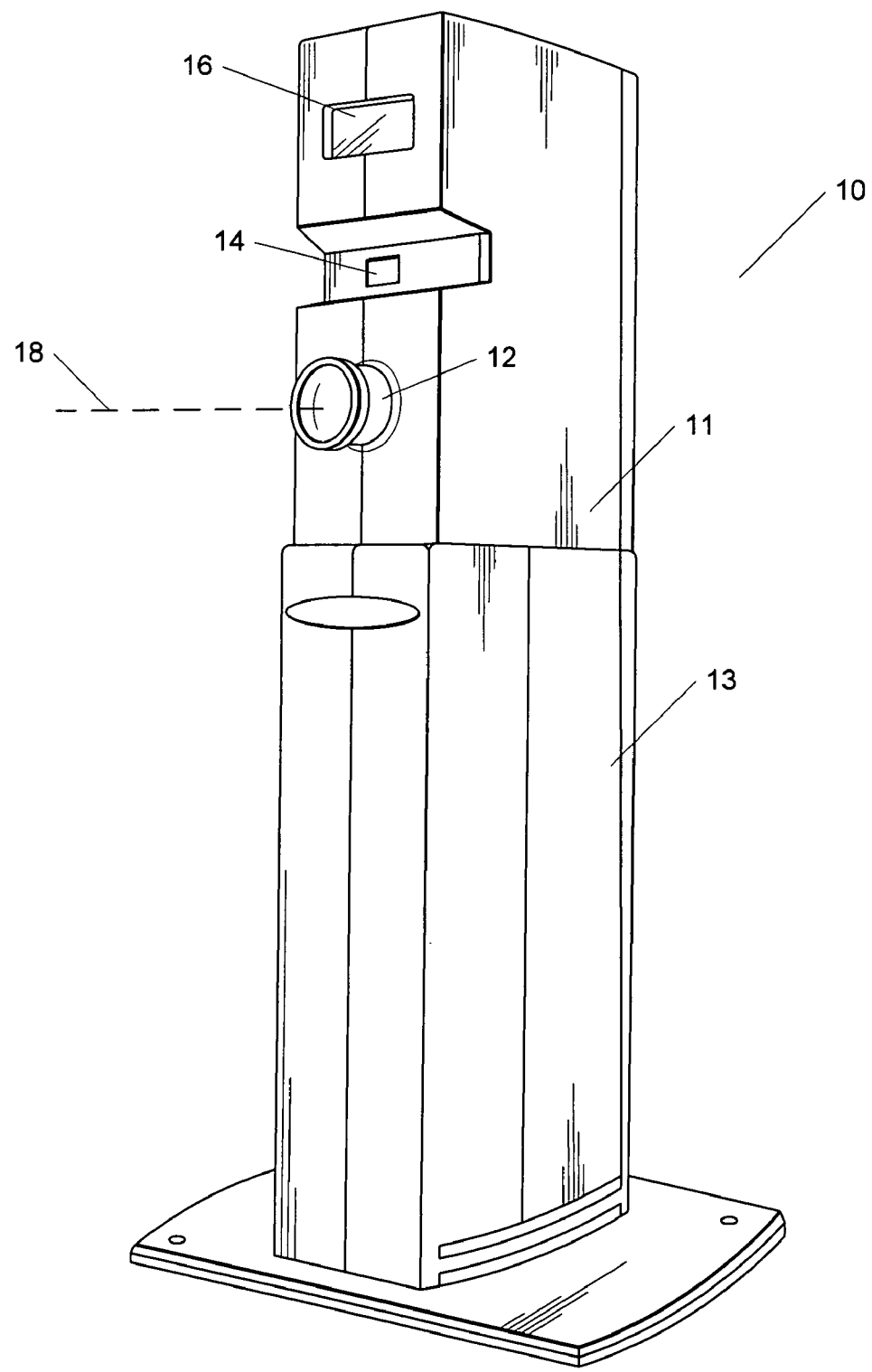
FIG. 1A illustrates an example of a prior art capture station.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

Detailed Description

Figures 3A, 3B:
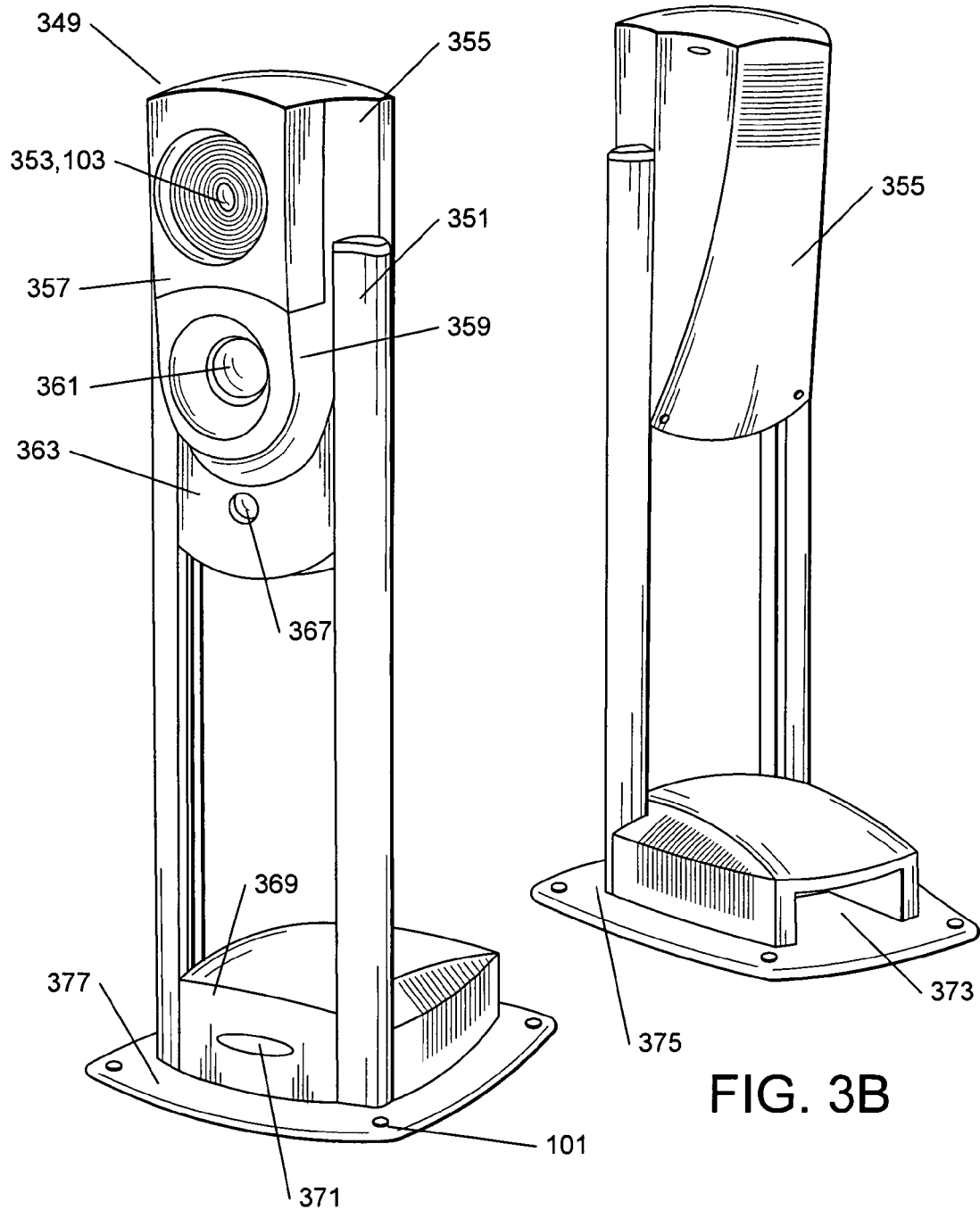
FIGS. 3A and 3B are front and back left perspective views, respectively, of a capture station in accordance with a first embodiment of the invention.
Figure 4:
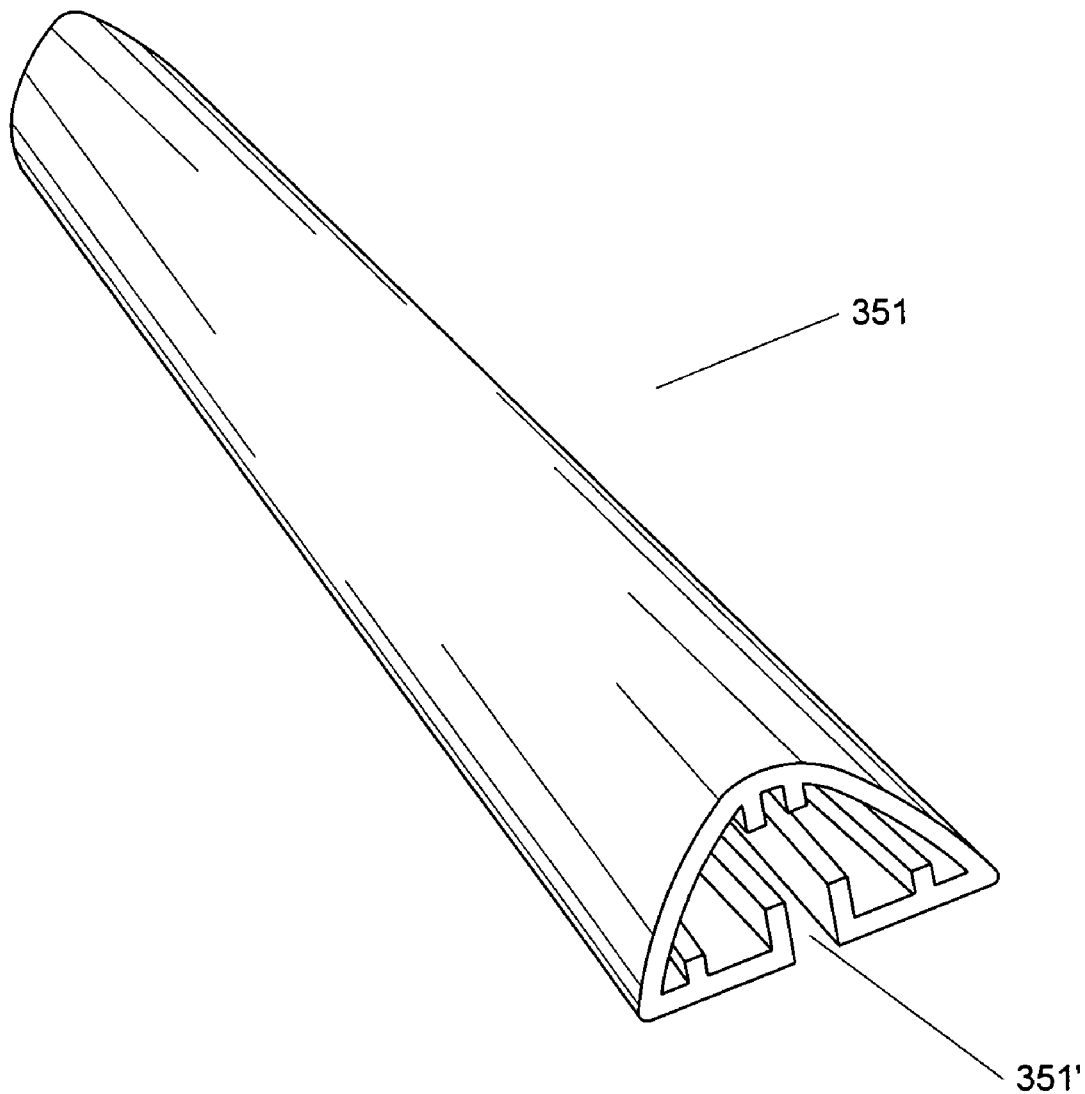
FIG. 4 is a perspective view of a leg of the capture station of FIG. 3A, showing a cross-sectional perspective.
Figure 9A:
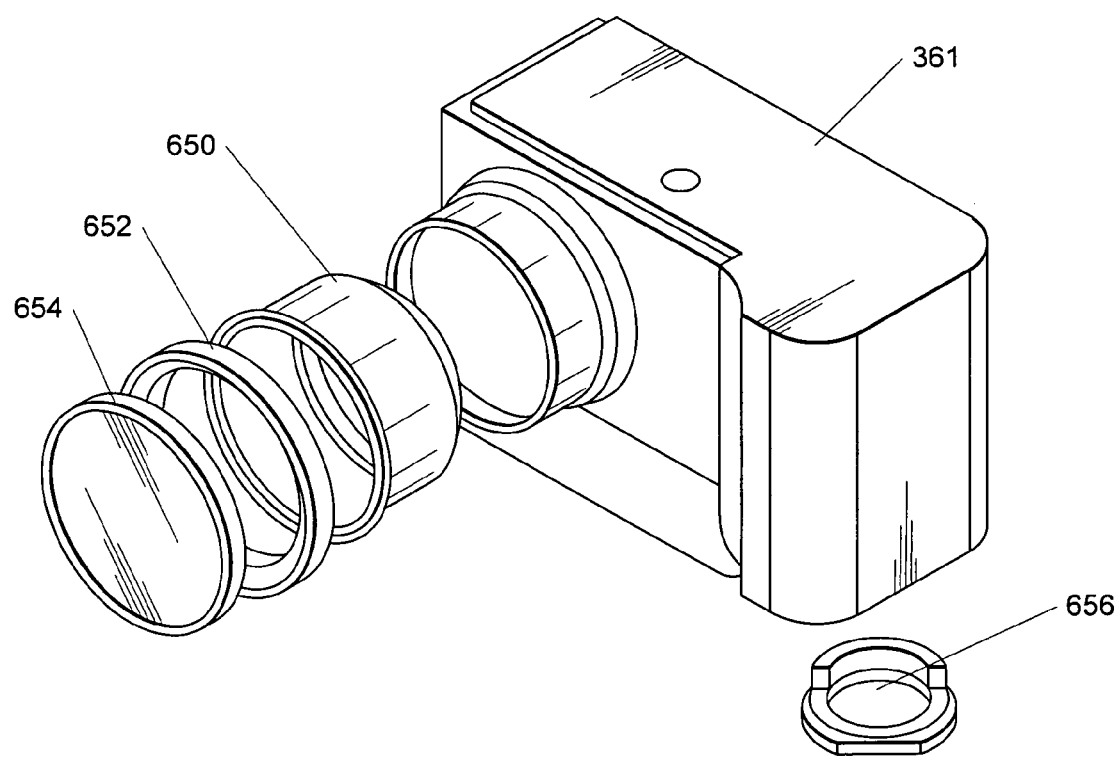
FIG. 9A is an exploded view of the imaging device of FIG. 8A.
Figure 9B:
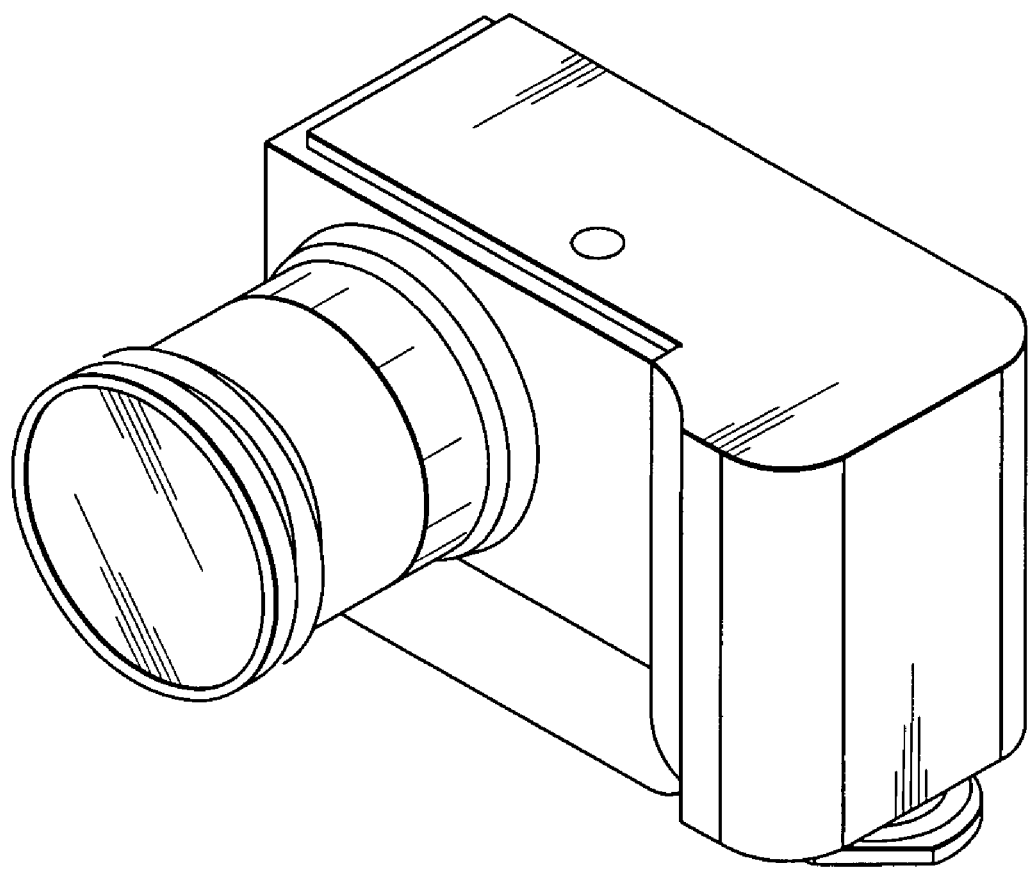
FIG. 9B is a view of the imaging device of FIG. 9A as fully assembled.

FIGS. 3A and 3B are front and back perspective views, respectively, of a multifunctional capture station 349 in accordance with a first embodiment of the invention. Another front perspective view of the multifunction capture station 349 is shown in FIG. 4, and a front view of the multifunction capture station is shown in FIG. 9. Referring to FIGS. 3A, 3B, 4, and 9, this capture station 349 includes a pair of elongated legs 351, a flash unit 353 (the flash unit 353 itself is contained within the capture station 349 and is not completely visible in these Figures; the flash unit 353 is also referred to herein as a "lighting device"), a back panel 355, a flash unit cover 357, a front panel 363, a camera 361 (the camera 361 itself is contained within the capture station 349 and also is not completely visible in these Figures, but see FIGS. 9A-9B), an image capture aid 367, and a base cover 369, which in this illustrative embodiment is a computer cover 369.

Figure 2:
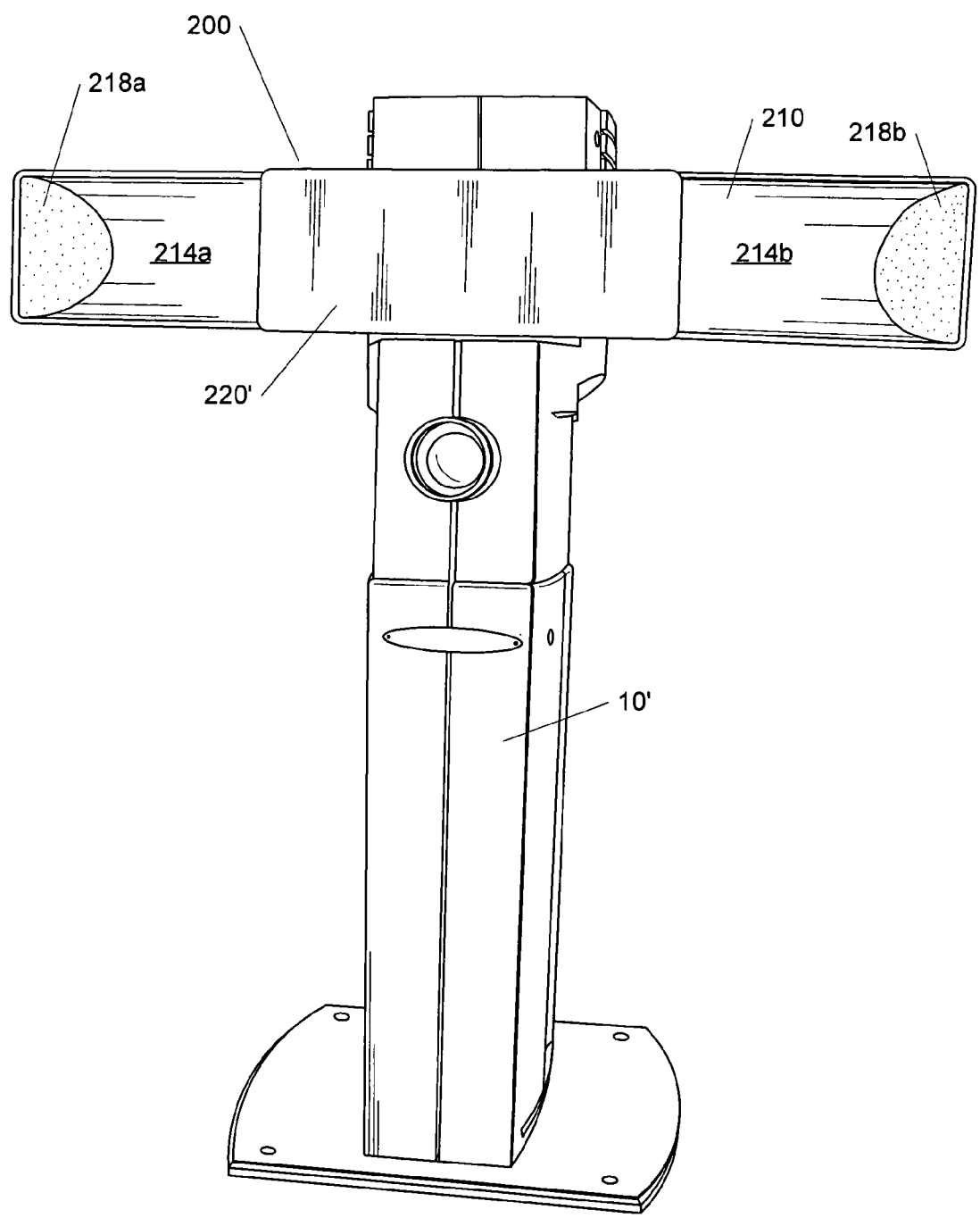
FIG. 2 is a perspective view of a shadow reduction device that can be used with the capture station of FIG. 1.
Figure 12:
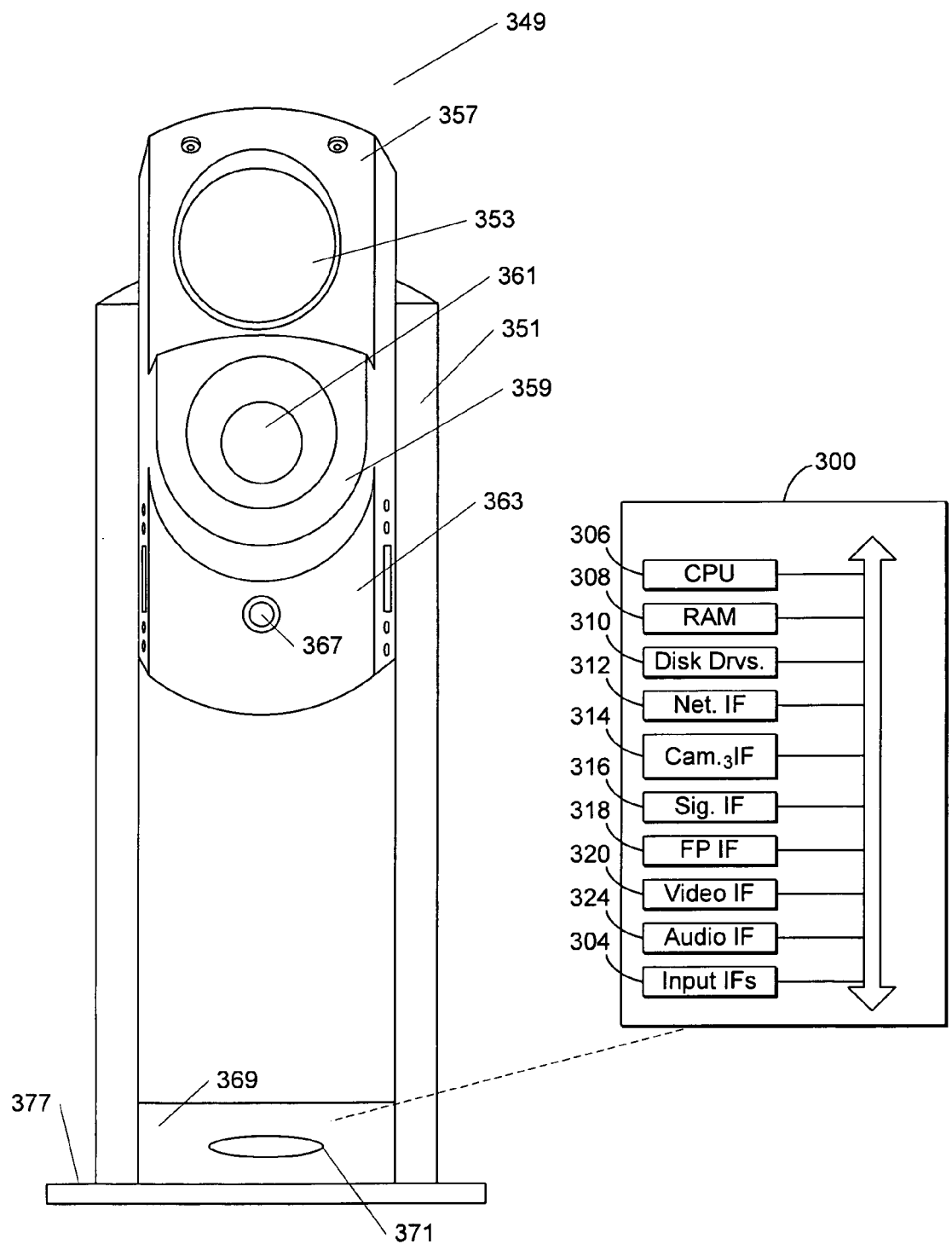
FIG. 12 is a front view of the capture station of FIG. 3A, illustrating an integrated computer and related components in the capture station.

The computer cover 369 is intended to cover and protect an optional computer 300 (not visible in these Figures), which in one embodiment is integrated into the capture station 349. The computer 300 is operable to control operation of the multifunctional capture station 349, as explained further herein. FIG. 12 illustrates a front view of a capture station 349 that is similar to the capture station 349 of FIG. 2A, and FIG. 12 includes a break away view revealing a computer 300 inside the capture station. The computer 300 is powered via a wall outlet connection (not shown), which wall connection also is coupled, via electrical wiring running through the legs 351, to a power strip 302 (not visible) mounted within the housing (formed by 357, 355) of the capture station 349. This power strip 302 also provides power for the imaging device 361 and lighting device 353. In one embodiment, both the imaging device 361 and the computer 300 can include power supplies to convert line voltage to the voltage/current for the respective device. In one embodiment, the lighting device 353 includes a strobe that is connected directly to line voltage. More information about the electrical connections is provided further herein.

Referring to now FIGS. 3A and 12, the computer cover 369 can include optional indicia for identifying a manufacturer or issuer, such as an optional nameplate 371 on the computer cover 369. The rear of the computer cover includes a computer cover opening 373. The computer cover 369 in this example also includes a plurality of ventilation holes 375, and can be coupled to a substantially planar mounting plate 377 having optional mounting holes 101. More information about the computer cover 369 is provided in connection with FIGS. 11A-11E.

Referring again to FIG. 12, the computer 300 is a general purpose computer that includes (preferably in a single package sized to fit within the computer cover 369) a processor 306, memory devices (RAM 308 and persistent storage such as fixed and removable disk drives 310, flash memory, etc.), and peripheral/interface devices, such as a network device interface (e.g., Ethernet card) 312, an imaging device (e.g., camera) and lighting device interface (e.g., USB port, Firewire interface, etc) 314, signature capture device interface (e.g., USB port) 316, and a fingerprint capture device interface (e.g., USB port) 318. Such a computer can be obtained from many different manufacturers, including from Via Technologies, Inc. (Fremont, Calif.). The processor may comprise a microcontroller or a microprocessor. In one embodiment, the computing platform of the capture station comprises a microprocessor executing an operating system (such as Windows XP from Microsoft, Unix or Unix variant), and in another it comprises an embedded controller, such as a Windows or Unix (or Unix variant) embedded controller.

In addition, the capture station can be transformed into a fully functioning computer workstation by plugging in a video monitor through its video device interface 320, speakers through its audio device interface 324, and/or keyboard (e.g., folding keyboard) and cursor control devices (e.g., mouse) through input device interfaces 304.

In one embodiment, a computer 300 is incorporated into the capture station 349 by installing a mainboard with CPU, memory, USB ports, network device interface, etc. from Via Technologies inside the base of the camera stand housing. At least some of the ports, such as the network device interface, and some of the USB ports, can be connected to an outer wall of the base and are exposed on the outside of the stand to enable connection to other devices and/or peripherals such as signature capture pads, scanner, fingerprint capture, etc. In one embodiment (see FIG. 14 and associated description), the other devices and/or peripherals can be coupled to a leg 351 of the capture station 349.

The combination of the imaging device 361 (e.g., digital camera) and a software component for controlling the imaging device (e.g., camera software component in the computer) provides complete automatic focusing, contrast correction and cropping that ensure consistent and uniform portraits. In one embodiment, we have used a software component called Find-a-Face™, which is available from Digimarc ID Systems of Burlington, Mass., to provide automatic face location, cropping, and color adjustment of captured images. The automated process that is substantially instantaneous and allows multiple operators from networked workstations to capture applicant portraits from sitting or standing positions without adjustment or intervention of any kind. This ease of operation produces significant efficiencies in customer throughput. The multifunction capabilities of the workstation allow complete intake, portrait & signature image capture, and driver's license production from multiple different networked workstations, or alternatively from the all in one capture station 349 itself.

The capture station 349's computer 300 executes programs from its memory, including an operating system (e.g., Windows XP from Microsoft Corporation), network communication programs (e.g., BSD socket software, TCP/IP and UDP software), a camera control module, a fingerprint capture module, a signature capture module, and other programs and data.

The network interface 312 and network communication software enables the computer 300 in the capture station 349 to communicate with two or more other computer workstations. For example, in one embodiment, the network interface is an Ethernet network interface, but other alternative networking hardware and related communication protocols can be used. For example, an operator can control the all in one capture station from a tablet PC, PDA or other portable computing device via a wireless connection to the capture station (e.g., according wi-fi standards such as 802.11b-g, etc.)

Among its network communication software, the all in one capture station 349 includes capture device interface software. This capture device interface software enables any workstation connected to the all in one capture station 349 via a network to control the functions of the capture stations, such as taking a picture, capturing signatures and fingerprints, and printing an ID card. This interface is an extension of a BSD socket software, which is responsible for establishing a network connection between the computer in the capture station and other workstations. The socket software sets up a network connection through a socket using TCP and/or UDP protocols. Executing on both the remote workstation and the all in one capture station, the socket software receives requests to transfer instructions and data. In response, it transforms instructions/data into packets for sending through the socket. The extension to this interface adds an application programming interface and corresponding code modules to provide function calls that enable capture station control functions. These functions can be grouped according to the devices in the capture station, such as the camera, the signature capture device, the identification document printer, the fingerprint capture device, and the machine-readable code reader (e.g., bar code reader; magnetic stripe reader, smart card reader, optical memory device reader, digital watermark reader, etc.).

For example, the camera control functions includes functions such as "Start the camera", "Initialize the camera", "Capture an image", "Close the camera", etc. Similarly, the signature capture functions include, "Start the signature pad", "Initialize the signature pad", "Capture a signature", "Close the signature pad", etc. The control functions for the fingerprint capture device are similar.

The computer 300 in the all in one capture station 349 operates in a "service mode" which enables the networking software and capture device software modules to execute without requiring a user to log on to the system. In one specific implementation, the service mode is the "service mode" of the Windows XP operating system executing in the all in one capture station.

Figure 3C:
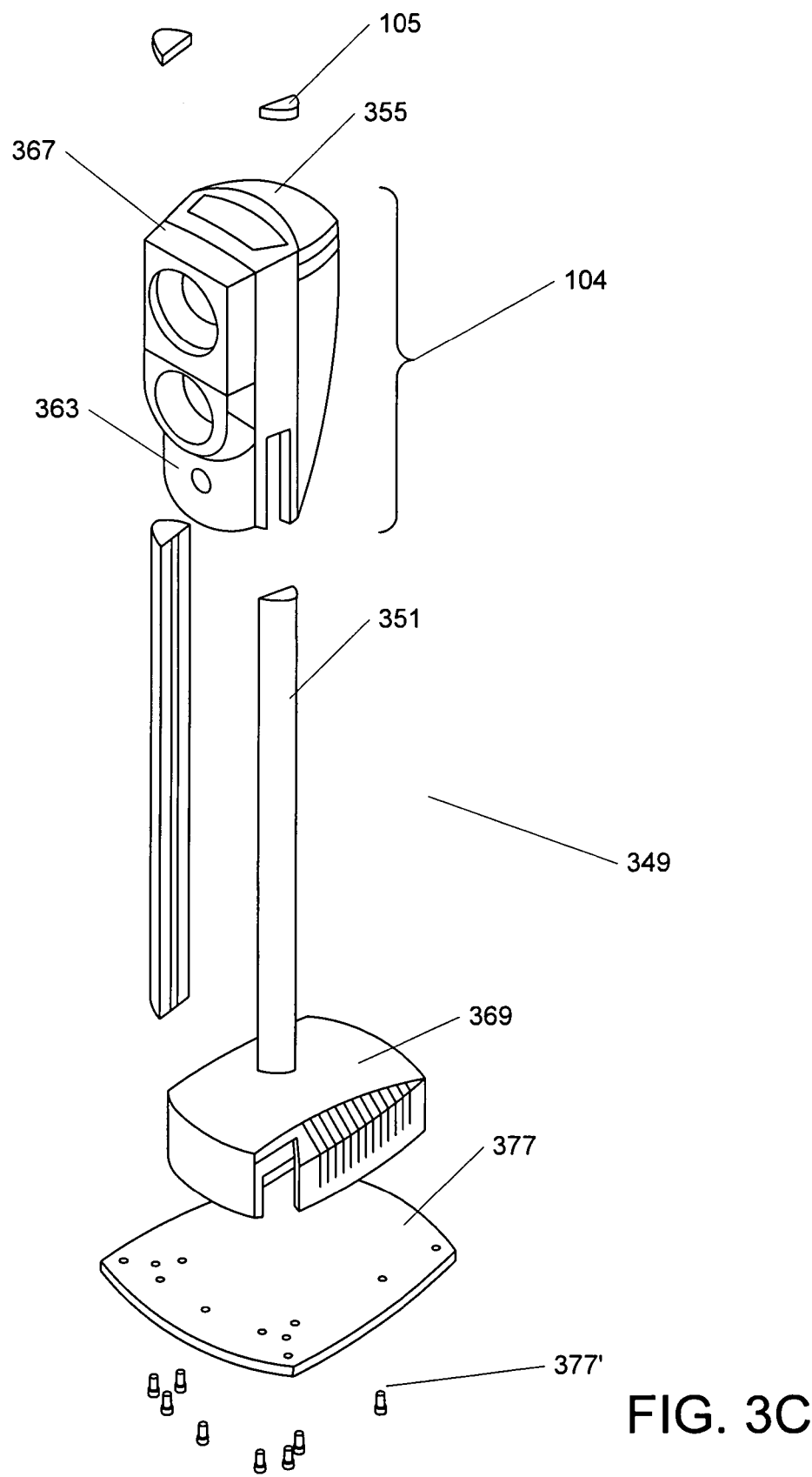
FIG. 3C is an exploded view of the capture station of FIG. 3A.
Figure 3D:
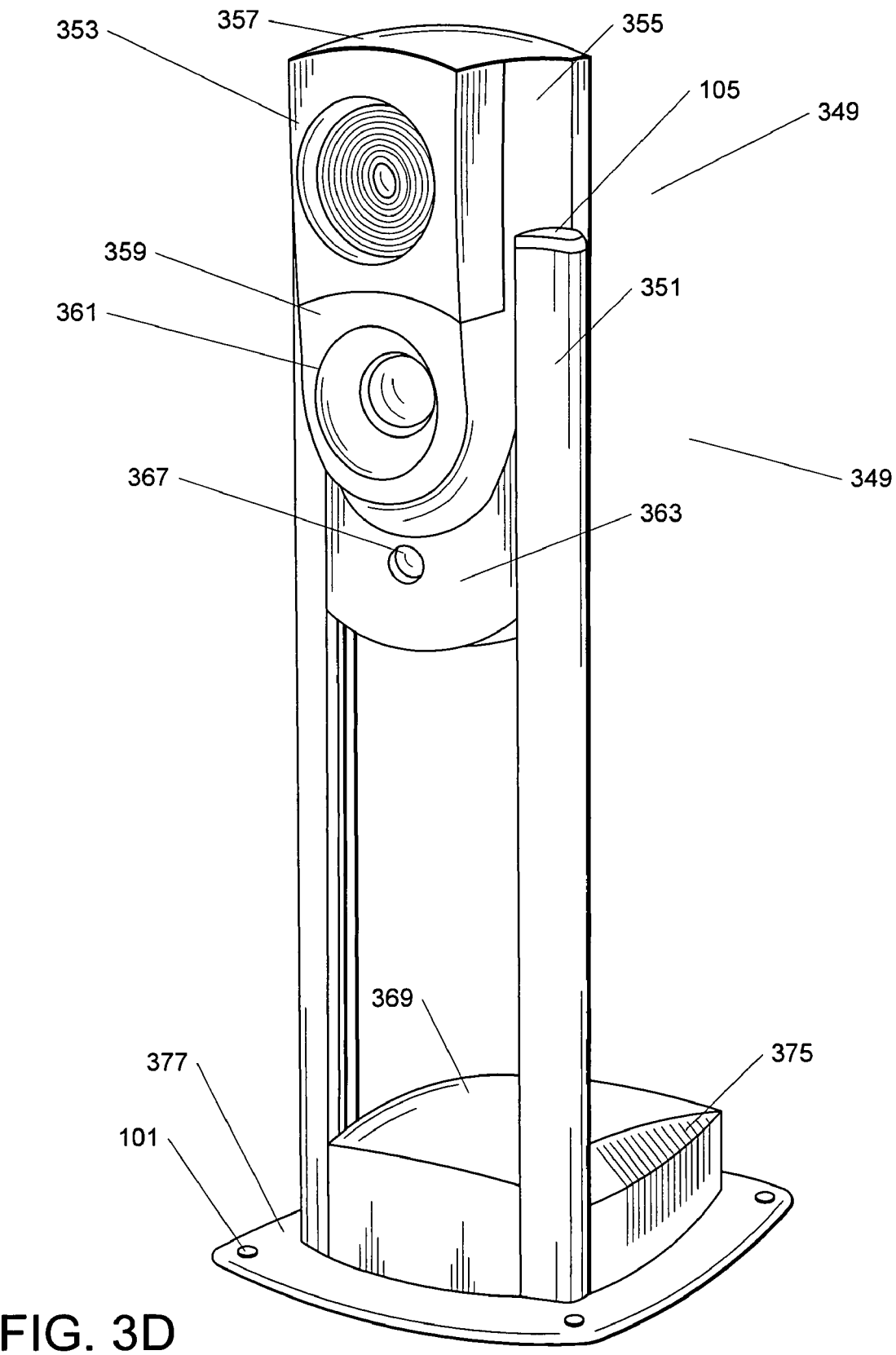
FIG. 3D is a front left perspective view of a capture station in accordance with a second embodiment of the invention.

As FIGS. 3C and 3D illustrate, the capture station 349 breaks up into three major sub-parts: (1) the base cover 369 (which includes an optional base 377 and mounting hardware 377' and which may include a computer 300 (not visible)), (2) the legs 351 (which include optional leg caps), and (3) a capture station top housing 104, which includes the front panel 363, back panel 355, flash unit cover 357, front middle portion 359, front bottom portion 369, camera 361, flash unit 353, and optional image capture aid 367. Each of these sub-parts is described more fully herein.

Legs

FIG. 4 is a perspective view of a leg of the capture station of FIG. 3A, showing a cross-sectional perspective. Each leg 351 of the capture station 349 is a substantially elongated structure designed to support the capture station top housing 104. FIG. 4 is Each leg 351 is constructed using a substantially rigid material (e.g., a metal such as aluminum or steel, etc., a rigid plastic such as PC, ABS, etc.) such that the leg (in combination with the other leg(s)) has sufficient strength to support the capture station top housing 104. In at least some embodiments, the legs 351 can be solid structures, especially if the capture station top housing 104 includes one or more connectors, jacks, and/or plugs, etc., for connection to the components contained therein. The legs 351 could also be solid and be provided with one or more clamps permitting cables or wires to be clamped or otherwise secured to the outer surface of the leg 351.

In an advantageous embodiment, however, the leg 351 has at least one opening 351' therein through capable of permitting at least a portion of a wire or cable between the capture station top housing 104 and a controller, such as the computer 300 described previously (the connection can also be made between the capture station top housing 104 and one or more external devices. This routing of cables through the legs helps simplify setup and use of the capture station, prevents accidental damage or disconnection of the cables, and can help eliminate tangled wires and instability in the setup of imaging device 361, lighting device 353, and computer 300.

For example, in the embodiment of FIGS. 3A and 3B, the opening is similar to a channel or conduit in the leg 351 which runs along at least a portion of the leg 351, permitting power, communications, and/or other connections/cable/wires to be routed from the flash unit 352 and/or the camera 361 to other devices (e.g., a computer). In an advantageous embodiment, the leg 351 had a cross section that is substantially circular or oval, but has a portion that is open so that the cable or wire can be removed and inserted. FIG. 4 is a perspective view of a leg of the capture station of FIG. 3A, showing a cross-sectional perspective and showing the leg opening 351' into which a cable or wire can be inserted. Of course, the example of FIG. 4 is but one example, and those skilled in the art will appreciate that many different cross sections are possible. The leg 351 can, however, take on any cross-sectional shape, especially any shape that is suitable for enclosing cable or wire— e.g., square, rectangular, triangular, elliptical, etc., as long as the cross-sectional shape enables the pair of legs 351 to support the capture station top housing 104.

Another feature of the legs 351 is that the channel 351' can also permit the capture station top housing 104 to be height adjustable. Openings (not visible in FIG. 4) can be formed in the leg 351 to permit multiple possible points of attachment to the capture station top housing 104. For example, in one embodiment, we have constructed the capture station top housing 104 and legs 351 to permit a height adjustment from 28 inches to 38 inches, to accommodate placement of the capture station 349 (for image capture purposes) on varying heights of tables and counters.

It also should be understood that although two legs 351 are illustrated in the embodiment of FIG. 3A, it is possible to construct the multifunction capture station 349 using just a single leg (see, e.g., FIGS. 20 and 21) or using more than two legs. Generally, the arrangement and number of legs 351 is selected to be sufficient to support the capture station top housing 104 in a stable configuration. If cables are being routed through one or more legs 351, then the arrangement and number of legs 351 is selected to be sufficient to accommodate the size and number of cables, wires, etc.

Capture Station Top Housing

Figure 5A:
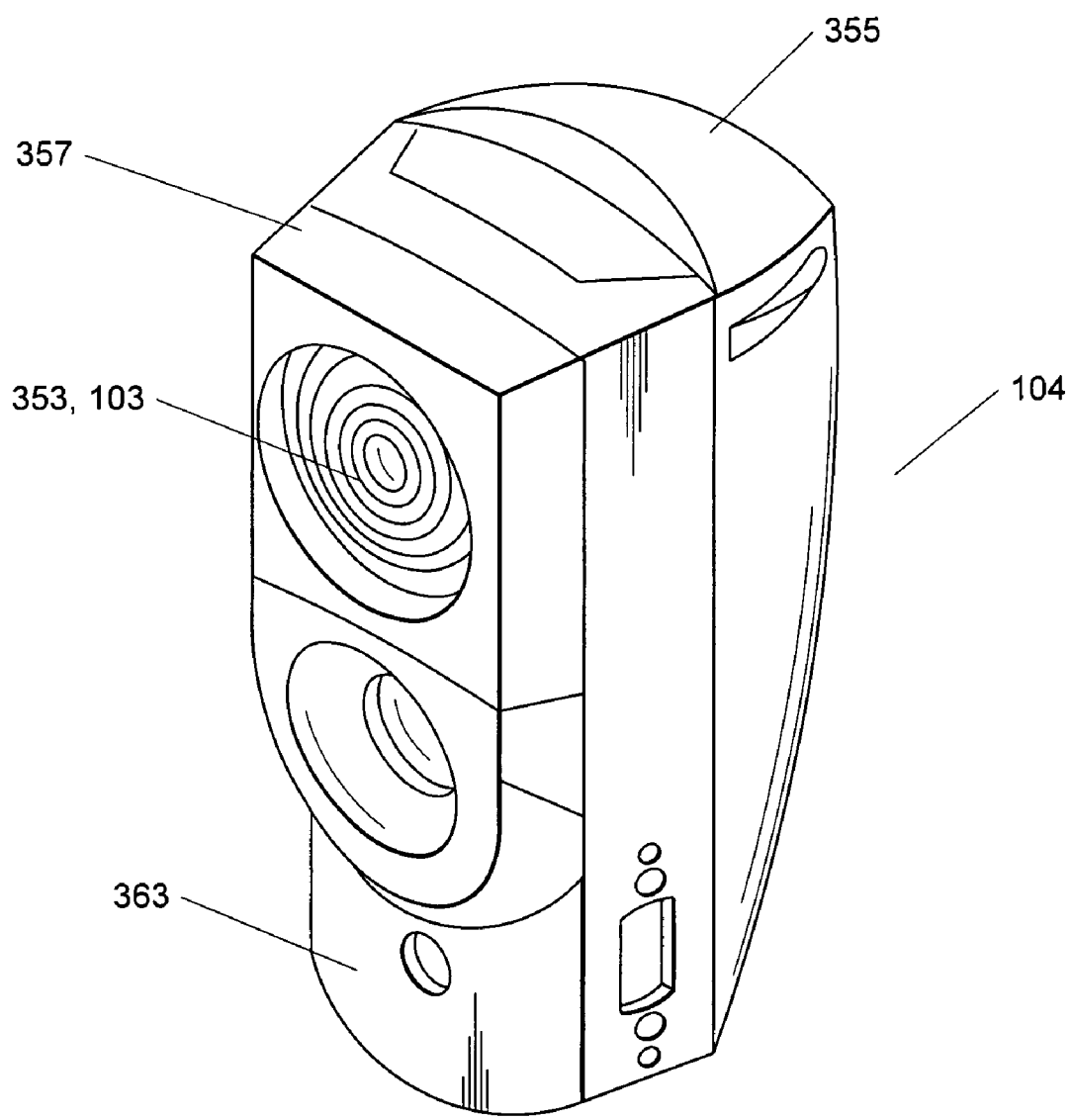
FIG. 5A is a left front perspective view of the capture station top housing.
Figure 5B:
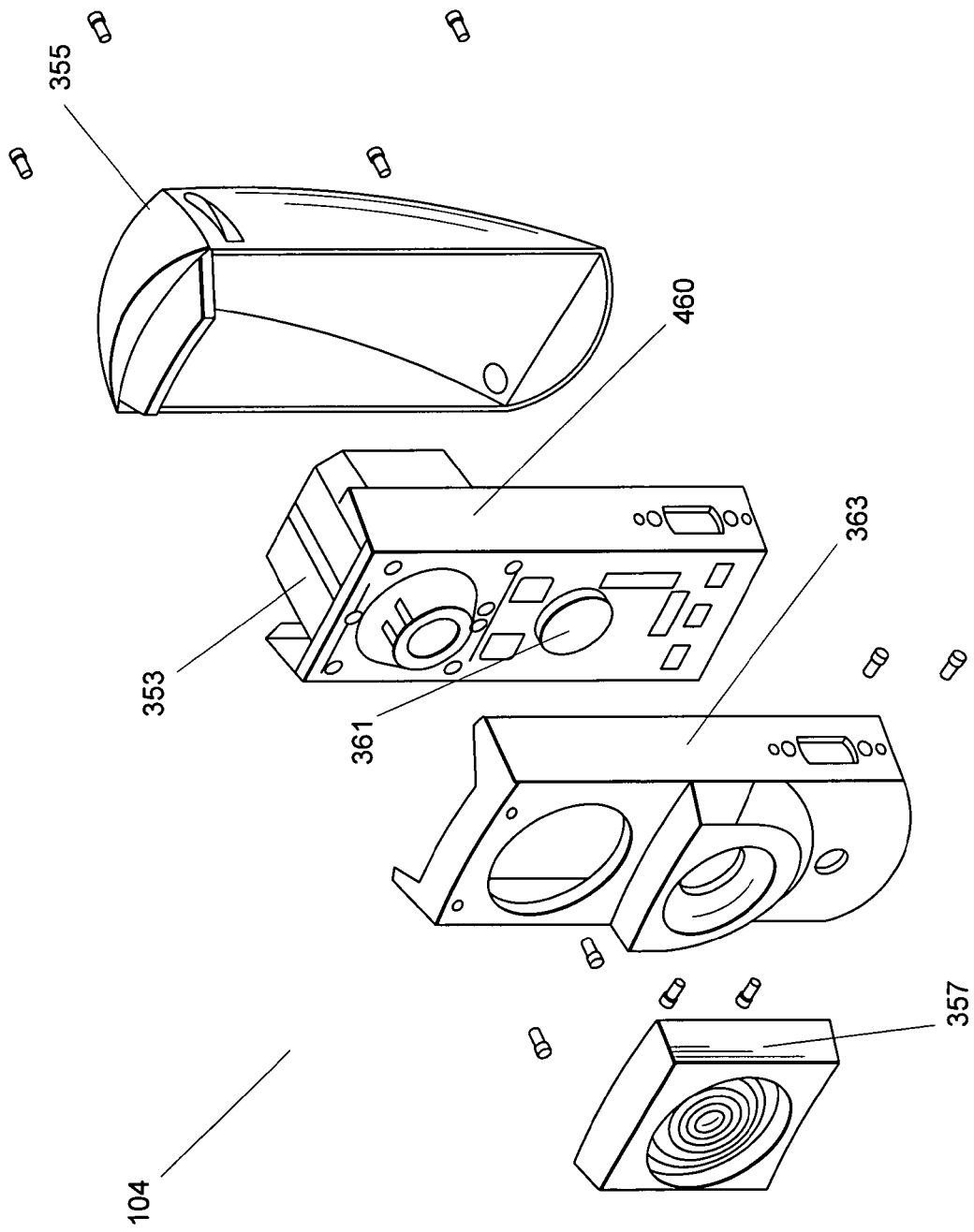
FIG. 5B is an exploded view of the capture station top housing of FIG. 5A.

FIG. 5A FIG. 5A is a left front perspective view of the capture station top housing, and FIG. 5B is an exploded view of the capture station top housing of FIG. 5A. As shown in FIG. 5B, the capture station top housing includes a flash unit cover 357, front panel 363, top housing mounting chassis 460 (to which the lighting device 353 and imaging device 361 are attached), and a back panel 355. Each of these sub parts is described more fully herein.

Figure 6A:
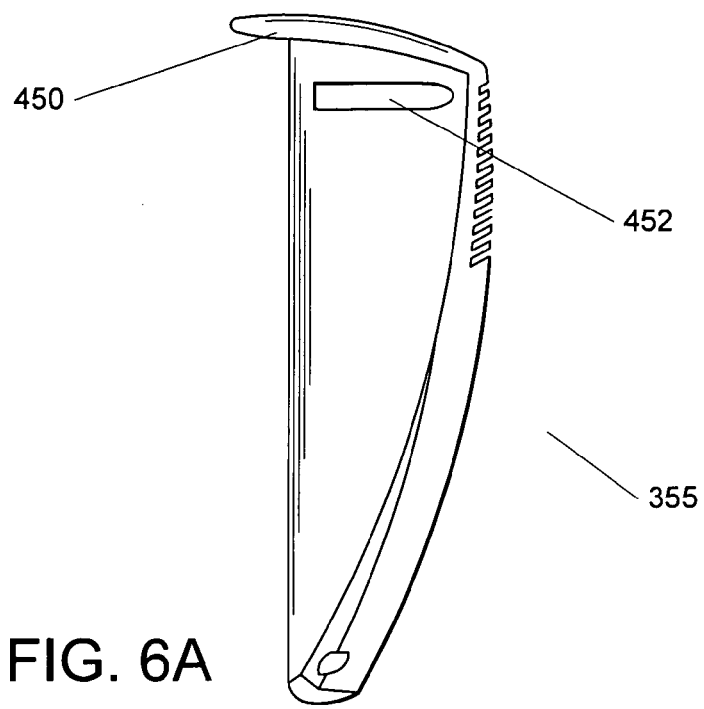
FIG. 6A is a left side elevational view of a back panel of the capture station of FIG. 3A.
Figures 6B, 6C:
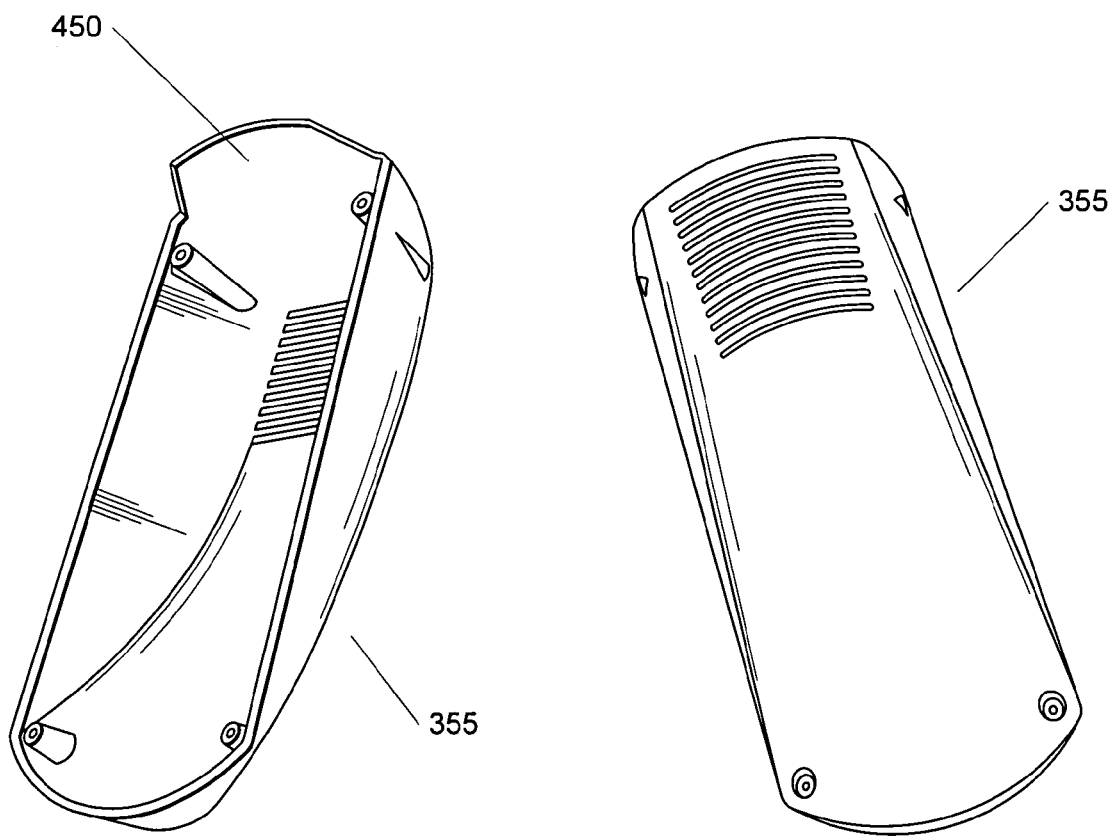
FIG. 6B is a left front perspective view of the back panel of the capture station of FIG. 3A, showing inner surfaces thereof.
FIG. 6C is a rear elevational view of the back panel of the capture station of FIG. 3A.

Referring again to FIGS. 3A-3D, the back panel 355 of the capture station top housing is constructed and arranged to mate with the front panel 363 and flash unit cover 357, and to provide a cover for and ventilation to the components contained within the capture station top housing 104. FIG. 6A is a left side elevational view of the back panel 355 of the capture station of FIG. 3A. FIG. 6B is a left front perspective view of the back panel of the capture station of FIG. 3A, showing inner surfaces thereof and mounting holes 355". FIG. 6C is a rear elevational view of the back panel of the capture station of FIG. 3A, showing ventilation openings 355.

The back panel 355 is also sized and constructed to couple to (and, preferably mate closely with) the front panel 363. For example, the back panel 355 includes a back panel lip 450 sized to mate with and snap into a corresponding back panel lip opening 452 in the front panel 363 (see FIG. 7B). The back panel 355 of this example embodiment also is formed to have an aesthetically pleasing, smooth, curved, and distinct appearance. The back panel 355 can be formed out of virtually any material suitable of holding the desired shape and of safely enclosing the components therein. The back panel 355 is made from any sturdy material capable of being formed into the back panel shape. Virtually any materials that are commonly used to house or enclose electronic equipment can be used to construct the back panel (e.g., materials including but not limited to plastic, semi-rigid polycarbonate (PC), Acrylonitrile-Butadiene-Styrene (ABS), ABS/PC, flame-retardant PC, ABS and ABS/PC products, polyvinyl chloride (PVC), polystyrene, high impact polystyrene (HIPS), polybutylene Terephthalate (PET), PC/PET, polybutylene terephthalate (PBT), PC/PBT, polyetherimide (PEI), acetal copolymer (POM), and metal.)

In a preferred embodiment, the back panel 355 is manufactured in a low-cost and rapid manner by molding it from a lightweight, low-cost material such as plastic. However, the back panel 355 (along with other parts of the capture station 349) in accordance with the principles of the invention could also be achieved by other manufacturing techniques capable of producing the respective parts effectively, in a quick, simple, low-cost, or otherwise improved manner. For example, the back panel 355 (or any other part of the capture station 349) could be formed by milling, punching, filing, or cutting the respective parts of the chassis out of a solid material, such as a solid plastic material. It also should be understood that the chassis could be made using materials of biological or metallic origin that possess the desired mechanical qualities. Details of the above-described materials and the manufacturing methods are well known to those skilled in the plastics and materials arts and are not disclosed herein in detail.

In addition, although not illustrated in FIG. 3A or in FIGS. 6A-6C, those skilled in the art will appreciate that, in at least some embodiment of the invention, the back panel could be modified to permit one or more electrical connections to be routed therethrough (e.g., to connectors on the back, top, or bottom thereof of the back panel 355), instead of running connections through the legs 351 via the front panel 363 (as described further herein). In addition, it will be well understood that many different designs for the back panels 355 can be provided to serve as a covering, provide ventilation, and/or provide a different ornamental appearance (e.g., straight or angled instead of curved, textured, etc). Examples of other embodiments of a back panel 355 that we have prepared include, for example, the back panels shown in FIGS. 13B, 17B, 17D, 19B, 20B, 21B, 22B, 23B, 24B, 25B and 26B herein, but these examples are not, of course, limiting The back panels 355 in any of the illustrated embodiments can, of course, be adapted to a capture station having one or more legs 351. We envision that many designs are possible in accordance with the invention.

FIG. 7A is a right side perspective view of the front panel 363 of the capture station of FIG. 3A, FIG. 7B is a bottom rear perspective view of the front panel of the capture station of FIG. 3A, and FIG. 7C is a front elevational view of the front panel of the capture station of FIG. 3A. As noted previously, the front panel 363 includes a back panel lip opening 452 that couples to the back panel lip 450. The front panel 363 includes front middle portion 359 and front bottom portion 369. As can be seen in FIG. 7A, the front middle portion 359 is shaped to protect the lens of the imaging device 361 (see FIGS. 8A, 9A, and 9B) from damage that can occur, such as during shipping, use, transport, etc. The front middle portion 369 also includes a lens opening 363' sized and arranged to align with a corresponding opening in the lens cover (FIGS. 10-10B), as well as a cable routing opening 363" and associate mounting holes for the leg 351. The cable routing opening 363" is sized to mate with the leg opening 351' of the leg 351 (FIG. 4) to permit cables, wires, and other connections to be routed from the capture station top housing 104 to a computer or other controller (e.g., a computer housed in computer cover 369).

The optional image capture aid 367 is a designated area on the capture station 349 where a subject can look as the subject's image is being captured (i.e., a "look here" button). The image capture aid 367, by providing a consistent place of subjects to look, can help to ensure consistency of image quality. In this embodiment, the image capture aid 367 is a circular colored portion formed in the bottom of the front panel 363 of the housing of the capture station 349. Of course, the illustrated type of image capture aid 367 is not limiting. The image capture aid can, for example, be an illuminated area, a mirror (permitting an applicant to check his or appearance), a graphic design, etc., and can have virtually any appearance. Of course, the capture station 349 need not be provided with an image capture aid 367, and other illustrated embodiments herein do not necessarily include an image capture aid 367.

Many different designs for the front panel 363 can be provided, in accordance with the invention, to serve as a covering, provide ventilation, and/or provide a different ornamental appearance (e.g., straight or angled instead of curved, textured, etc). Examples of other embodiments of a front panel 363 that we have prepared include, for example, the front panels shown in FIGS. 13A, 17A, 17C, 19A, 20A, 21A, 22A, 23A, 24A, 25A and 26A herein, but these examples are not, of course, limiting The front panel 363 can be manufactured using similar manufacturing methods and materials similar to the materials suitable for making the back panel 355, although the front and back panels need not be manufactured from the same material or in the same way.

Figure 8A:
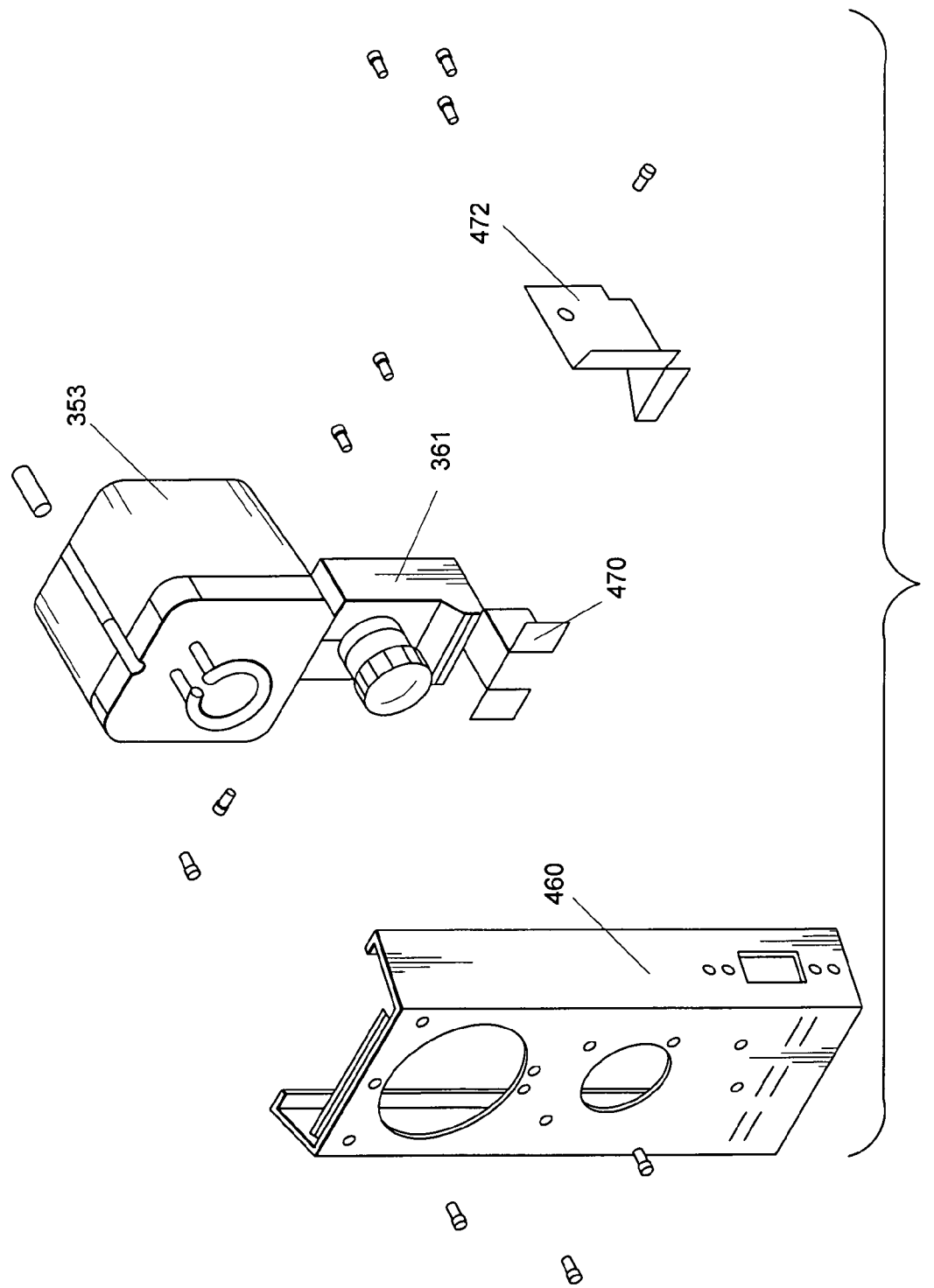
FIG. 8A is an exploded view of a mounting bracket, lighting source, imaging device, and associated hardware, which can be used with at least one embodiment of the invention.
Figure 8B:
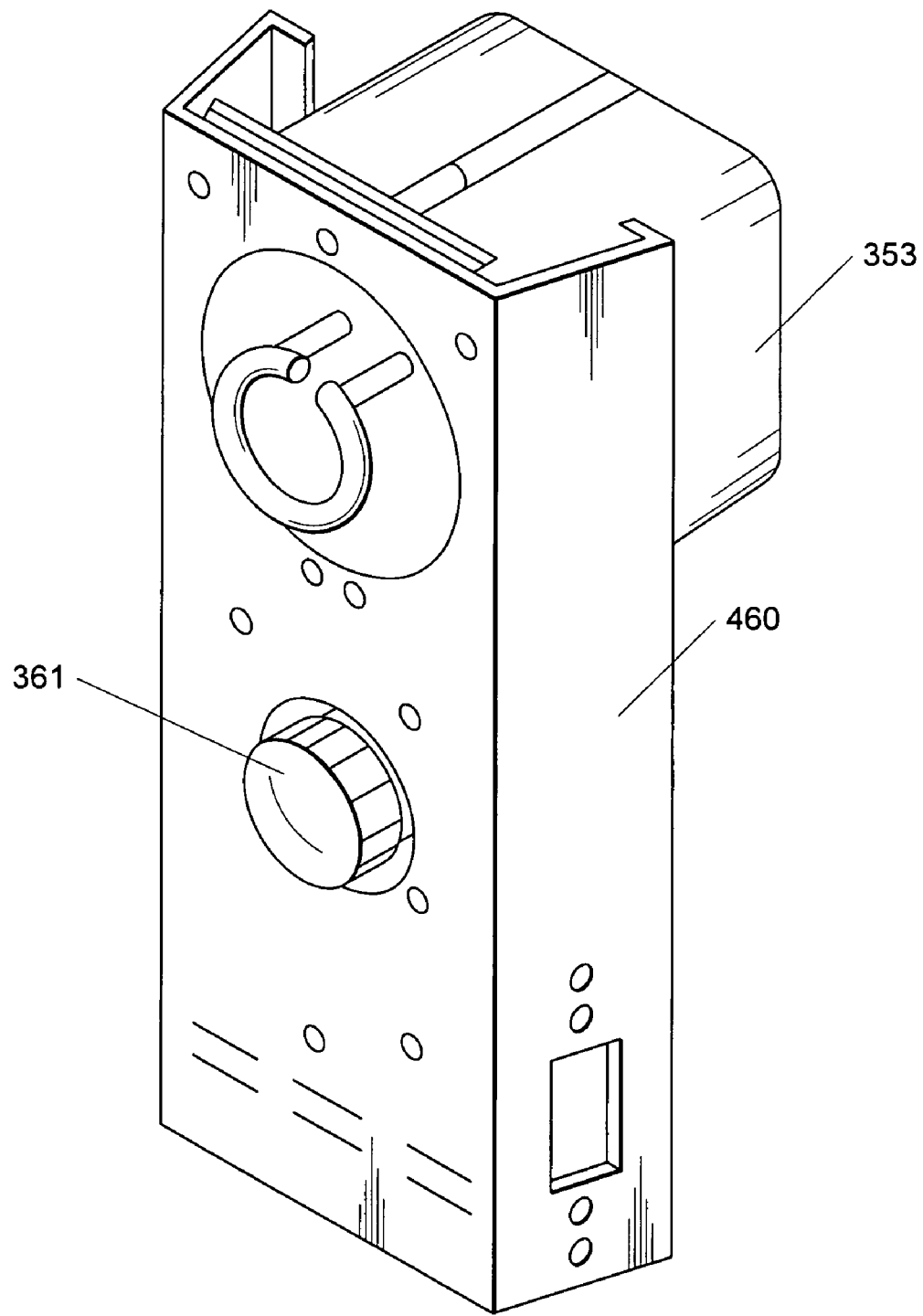
FIG. 8B is a view of the mounting bracket, lighting source, imaging device, and associated hardware of FIG. 8A as assembled together.

FIG. 8A is an exploded view of a top housing mounting chassis 460, lighting source 353, imaging device, and associated hardware, which can be used with at least one embodiment of the invention, and FIG. 8B is a view of the mounting bracket, lighting source, imaging device, and associated hardware of FIG. 8A as assembled together. The top housing mounting chassis 460 helps to hold in place the lighting device 353 and the imaging device 361, via a pair of brackets (namely, the imaging device mounting bracket 472 and the lighting device mounting bracket 470). The imaging device mounting bracket 472 attaches to both the imaging device 361 and the top housing mounting chassis 460. The lighting device mounting bracket 470 attaches to both the lighting device 353 and the top housing mounting chassis 460.

The top housing mounting chassis 460, the imaging device mounting bracket 472, and the lighting device mounting bracket 470 can be manufactured using similar manufacturing methods and materials similar to the materials suitable for making the back panel 355, although the top housing mounting chassis 460, the imaging device mounting bracket 472, and the lighting device mounting bracket 470 need not be manufactured from the same material or in the same way. In a preferred embodiment, the top housing mounting chassis 460, the imaging device mounting bracket 472, and the lighting device mounting bracket 470 are made from aluminum.

FIG. 9A is an exploded view of the imaging device 361 of FIG. 8A, and FIG. 9B is a view of the imaging device 361 of FIG. 9A as fully assembled. The imaging device 361 can be any type of imaging device capable of capturing digital images of a subject, such as a digital camera (which is what we have used in the embodiment of FIG. 9A). The digital image taken can be a still image, a video image, or can include both types of images. The digital camera imaging device 361 includes a lens extension 650, filter seat 652, filter 654, and switch knob 656. As FIG. 9B illustrates, when fully assembled the lens extension 650, filter seat 652, and filter 654 project away from the digital camera 361 and can be vulnerable to damage, but, as noted previously, the front panel 363 includes a front middle portion 359 designed to protect this part of the digital camera 361 from impact, scratches, smudging, and dust by providing a forming a partially rounded "doughnut" type enclosure.

In one embodiment, we have used for the imaging device 361 a charge control device (CCD) solid state digital camera having 4 megapixel resolution (of course, the resolution can vary depending on the desired image quality). Digital cameras capable of this type of image resolution are available from many different sources, such as Kodak, Canon, Nikon, Olympus, etc.

The flash unit 353 (FIGS. 8A, 8B) is an industrial or studio quality flash internal unit that preferably is designed to have a long life (e.g., a life expectancy of over 250,000 exposures compared to 3000-10,000 or fewer for a some conventional internal consumer-quality flash units). Studio quality flash units can be obtained from many different sources, such as Olympus America, Inc., of Melville, N.Y., Vivitar USA of Oxnard, Calif., Minolta Corporation of Ramsey, N.J., etc. As shown in FIG. 9, the flash unit cover 357 includes a flash lens 103 that works in cooperation with the flash unit 103.

Figure 10A:
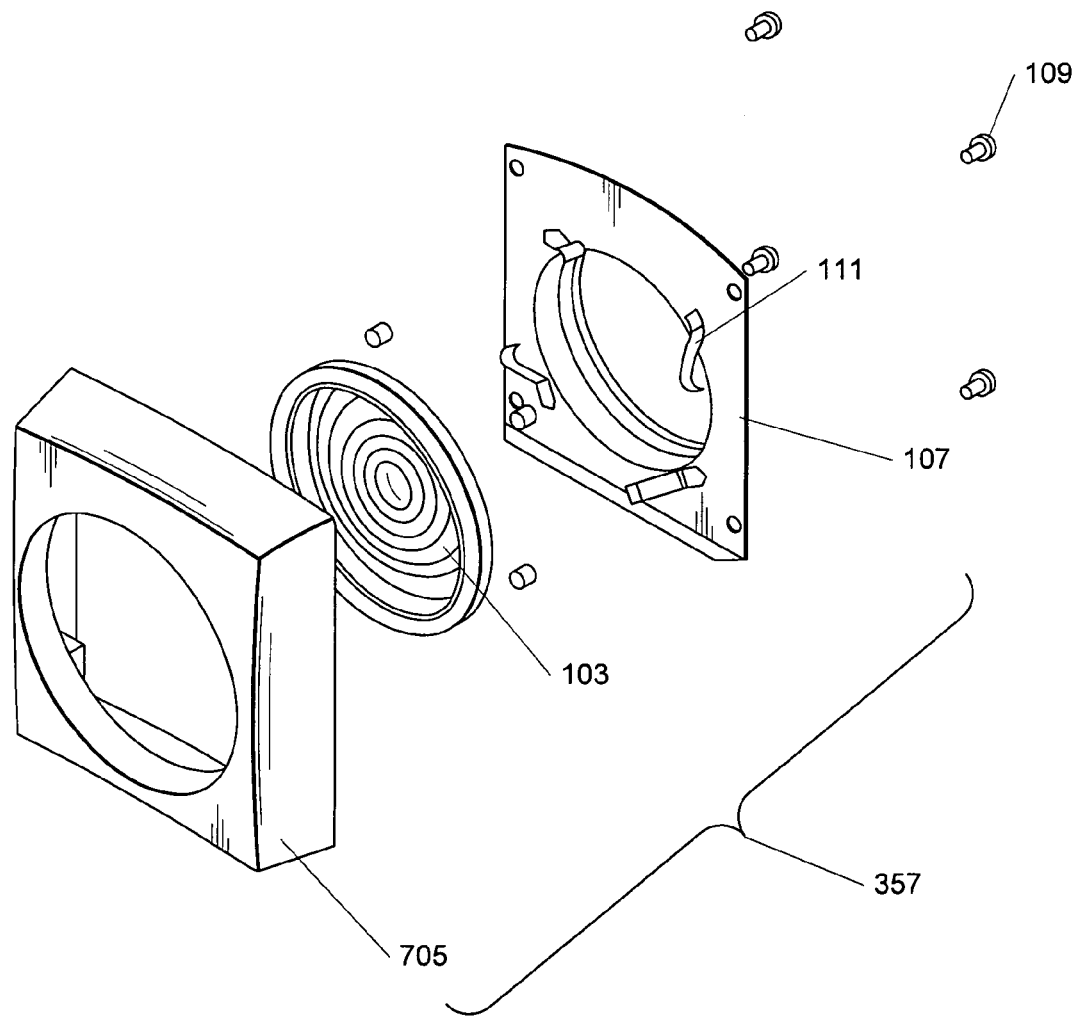
FIG. 10A is an exploded perspective view of a lens cover for the capture station of FIG. 3A.
Figure 10B:
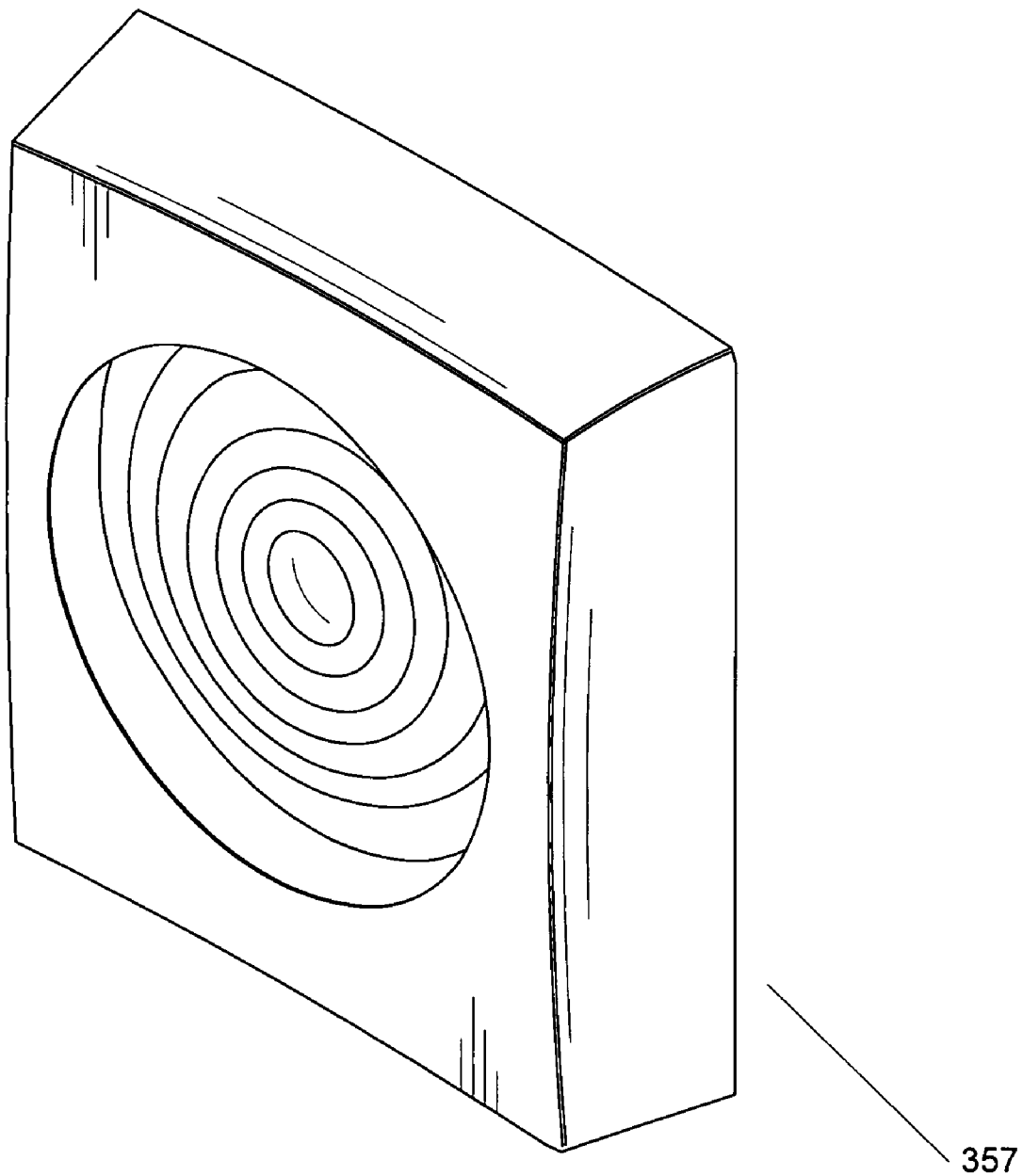
FIG. 10B shows the lens cover of FIG. 10A fully assembled.

FIG. 10A is an exploded perspective view of a lens cover 357 for the capture station of FIG. 3A, and FIG. 10B shows the lens cover 357 of FIG. 10A fully assembled. The lens cover 357 includes a lens cover piece 705, lens 103, lens bracket 107 (which includes one or more mounting clips 111), and mounting screws 109. The lens cover piece 705 and lens bracket, can be made of materials similar to the back panel cover 355 and can be manufactured in a similar manner. In our embodiment, the lens cover piece 705 is made of plastic and the lens bracket 107 is made of metal.

The flash lens 103 is a flash cover designed to ensure proper illumination to help reduce subject squinting and bright spots. In one embodiment, the flash lens 103 is made from a material having a transparency or translucency sufficient to permit the lighting device 353 to properly illuminate the subject. Suitable materials for the flash lens 103 include glass and plastic, along with any other material having the requisite transparency or translucency. In one embodiment, the flash lens 103 is a Fresnel lens and can be used with the flash unit 353 to improve light illumination of a subject. Advantageously, such a Fresnel lens can have a rear face that is sufficiently "roughened" to permit the Fresnel lens to also provide diffusion of the flash when illuminating a subject. Roughened Fresnel lenses can be obtained from many different sources, including Kupo Company, Ltd of Taipei, Taiwan. Other devices for directing light, such as diffusers, also can be used as a light directing device 103 in at least some embodiments of the invention.

Figure 11A:
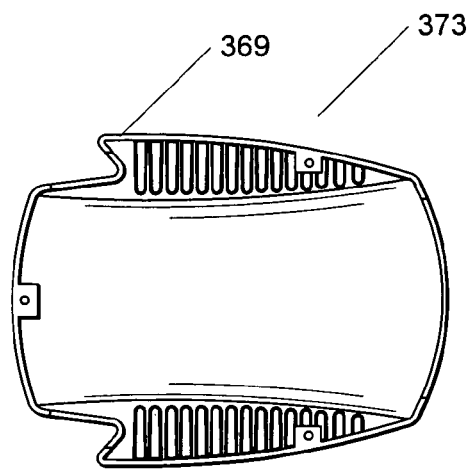
FIG. 11A is a bottom elevational view of the computer cover of the capture station of FIG. 3A.
Figure 11B:
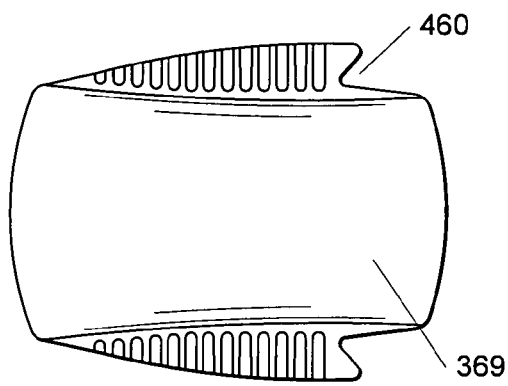
FIG. 11B is a top plan view of the computer cover of the capture station of FIG. 3A.
Figure 11C:
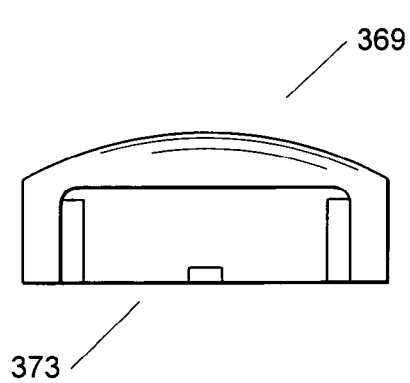
FIG. 11C is a bottom plan view of the computer cover of the capture station of FIG. 3A.
Figure 11D:
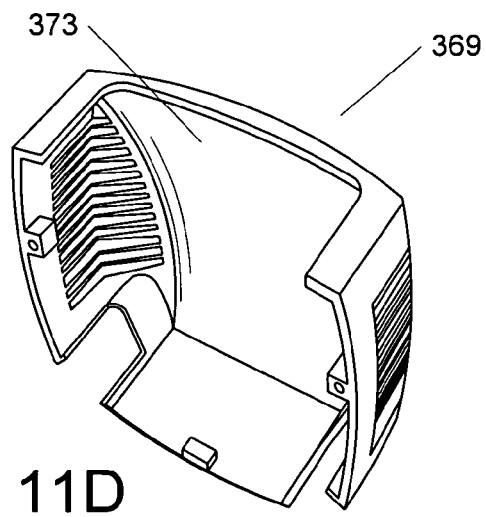
FIG. 11D is a bottom rear perspective view of the computer cover of the capture station of FIG. 3A.
Figure 11E:
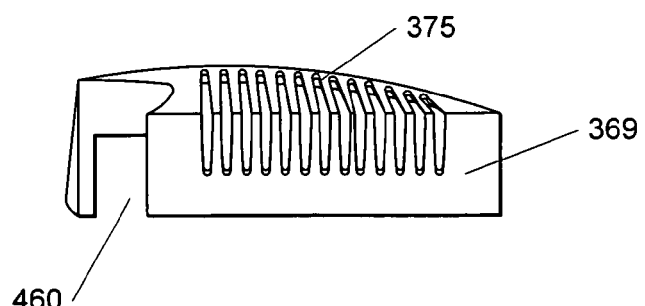
FIG. 11E is a left side elevational view of the computer cover of the capture station of FIG. 3A.

FIGS. 11A-11E provide various views of the computer cover 369 of the multifunctional capture station 349. FIG. 11A is a bottom elevational view of the computer cover of the capture station of FIG. 3A. FIG. 11B is a top plan view of the computer cover of the capture station of FIG. 3A. FIG. 11C is a bottom plan view of the computer cover of the capture station of FIG. 3A. FIG. 11D is a bottom rear perspective view of the computer cover of the capture station of FIG. 3A. FIG. 11E is a left side elevational view of the computer cover of the capture station of FIG. 3A.

The computer cover 369 is a structure sized to house a computer 300 or other computing device (not shown) and also to enclose at least some of the connection cables and wires routed through the legs 351, to be operably connected to the computer 300 and/or other devices. The computer cover 369 includes at least one ventilation hole 375 (the number and style of ventilation holes will, of course, depend on the power dissipation of the computer 218) and a computer cover opening 373. The computer cover opening 373 can, in one embodiment, be covered by a removable or fixed cover (not shown) which cover may include one or more connectors for communicating with the computer 218 and/or other capture station elements).

Capture Station with Additional Peripheral Components

Figure 14:
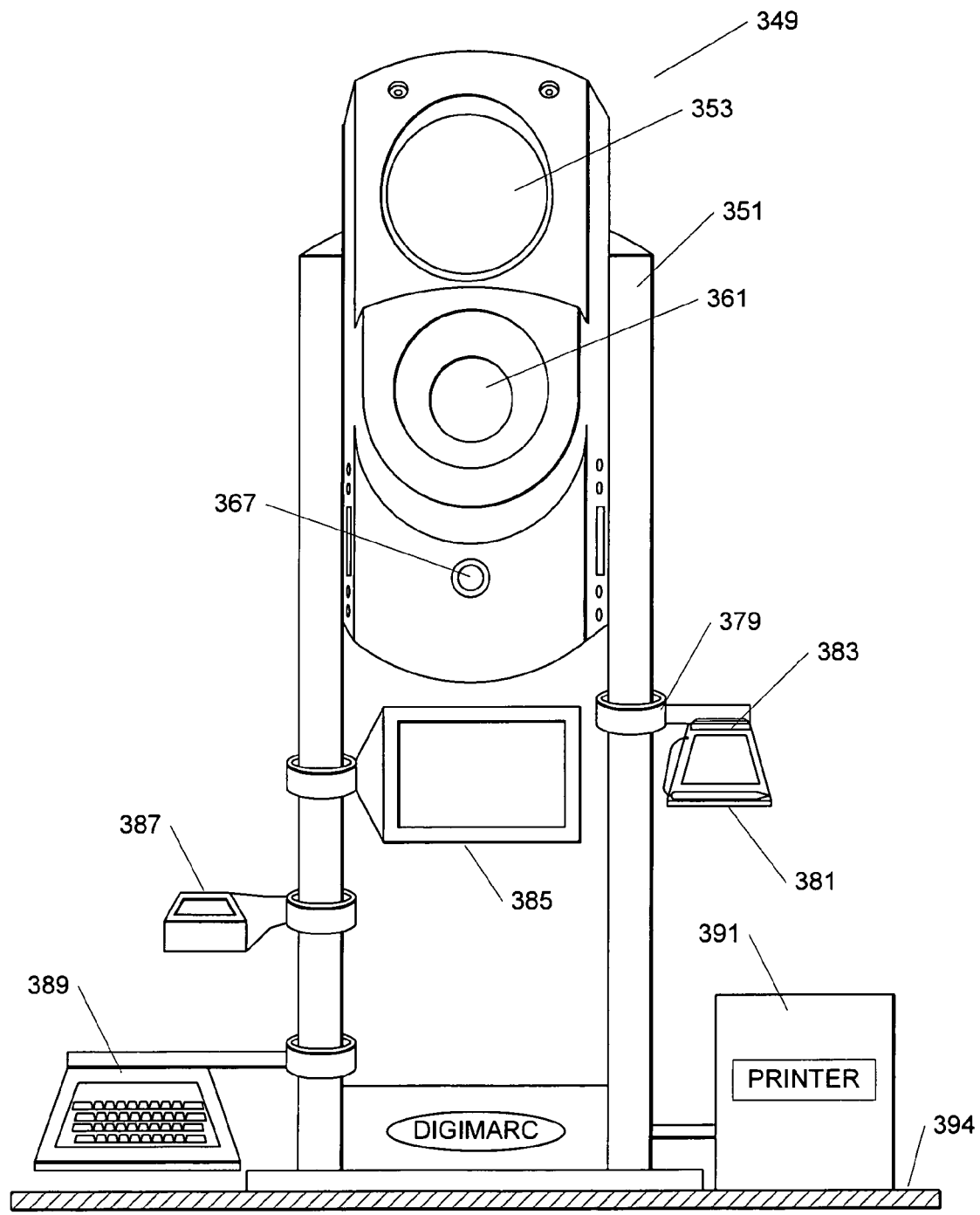
FIG. 14 is a front view of a capture station in accordance with a second embodiment of the invention.

FIG. 14 is a front view of an embodiment of the capture station 349 with optional peripherals coupled to the capture station 349, sitting on a desktop 394. We have found that by providing a capture station top housing 104 coupled to a base via legs 351 having conduits 351' therein, we can use the outside surfaces of the legs 351, as well as the legs themselves, to provide further advantageous functionality to the capture station 349. Specifically, as shown in FIG. 14, we can attach various peripherals to the legs, such as by clamping, screwing, gluing, etc. (in the embodiment of FIG. 14, we use clamps 379). For example, recall that the process for producing an identification card includes functions such as (a) capturing personalized information (e.g., cameras for photographic images, scanners, readers, and/or cameras for biometric data, electronic signature pads for signatures, etc):

(b) entering information (e.g., keyboards and/or pointing devices for entering name and address, etc.):

(c) processing the transaction (e.g., point of sale (POS) devices, credit card readers, receipt printers, etc);

(d) and producing a permanent or temporary identification document (e.g., printers to produce temporary paper identification documents, so-called "over the counter" or on the spot identification document printers and/or laminators, and so-called "central issue" and other large scale identification printing systems;

(e) storing the captured information for future retrieval and/or providing to external sources (e.g., memory systems, image storage systems, etc.); and (f) performing all processing, device control, communications, and other operations (both automated and manual) necessary to perform functions (a) through (e=d), e.g. via a computer, such as a standalone computer system.

The embodiment of the capture station 349 of FIG. 14 can help to perform some or all of these functions. For example, we can provide a fingerprint scanner 387 to capture biometric information such as fingerprints, a signature capture device 381 to capture a subject's signature, and a magnetic strip reader 383 to read a magnetic strip (e.g., if a subject is paying for the application document by credit or debit card). A keypad 389 can be used to enter information about a subject, such as demographic data. A printer 391 can also be provided; the printer can be a type suitable for printing an identification card itself (whether temporary or permanent), a receipt, and/or other records. A compact display 385 can also be provided; this display 385 can be used for many purposes, such as conducting an eye test of an subject, displaying to a subject a replica of the subject's captured image (so that the subject can determine if the image is acceptable), displaying recorded information to a subject, giving a test (e.g., a written driving test) to a subject, etc. The display 385 also can be used by an operator of the capture station 349. Even a mirror (not shown) could be coupled to the leg 351, to enable a subject to check his or her appearance.

For peripheral devices requiring power and/or connections to a computer or other device, the requisite connections can, if desired be routed through the legs 351 in the manner of routing the other connections. Such connections could also, of course, be outside the leg. We also anticipate in many instances that wireless and/or battery powered peripherals can be used to help reduce physical connections.

The positioning and arrangement of peripherals on the legs 351 can be varied depending on factors such as the weight of the peripheral, its size, and where it will be best utilized by a subject or operator. For example, it may be preferable to place a signature pad 381 and biometric scanner 387 at heights and orientations that enable ease of use by subjects of a variety of heights.

Many other types of peripherals can be coupled to the legs 351, as those skilled in the art will appreciate, and the listing of peripherals here and those shown in FIG. 14 are intended to be illustrative and not exhaustive. Further, many different manufacturers of such peripherals exist and are usable with the invention, provided the peripheral can be appropriately coupled to the leg (whether by itself or via a clamp, plate, strap, screw, bolt, hook, rivet, nail, latch, hinge, lock, etc.). We presume that those skilled in the art are familiar with the manufacturers of such peripherals, and they are not listed here. In addition, as those skilled in the art will recognize, the method of coupling to the leg will depend on the device itself and the configuration of the leg. We also anticipate that certain relatively "flat" or "slip" peripherals (e.g., displays, signature pads, etc.) could instead be made to snap or hinge off of the base cover 369 rather than the legs 351.

System Environment of Capture Station.

Figure 15:
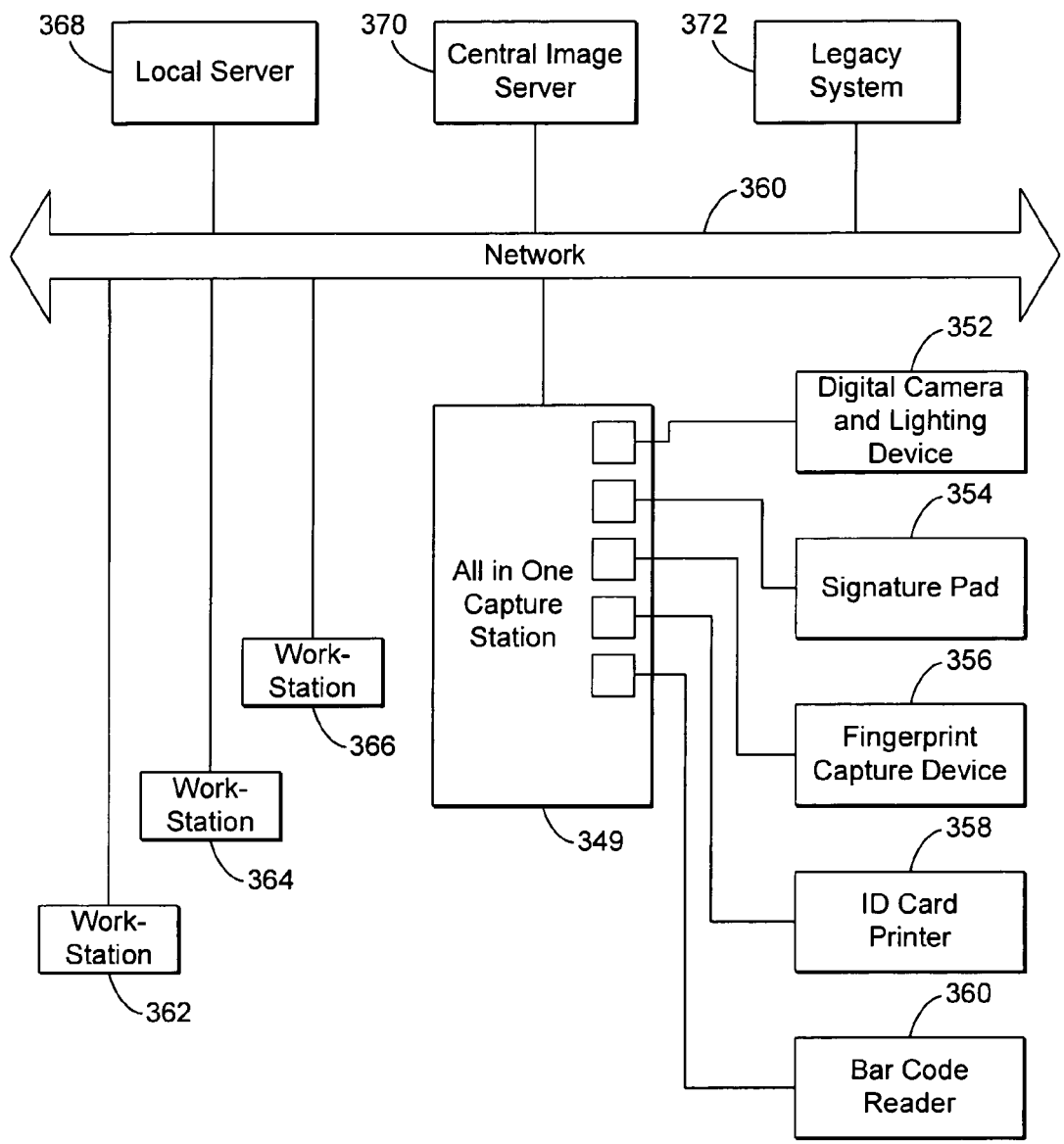
FIG. 15 is a system diagram illustrating a typical computing environment in which a capture station in accordance with at least one embodiment of the invention is used.

FIG. 15 is a system diagram illustrating a typical computing environment in which a capture station in accordance with at least one embodiment of the invention is used and illustrates a typical configuration of workstations and the all in one capture station in an identification document enrollment facility. In this configuration, the all in one capture station 349 includes a digital camera and lighting device 352 as shown in FIG. 11, and is connected to a signature pad 354 for capturing handwritten signatures of applicants, a fingerprint capture device for capture fingerprints (e.g., for biometric log on authentication and/or capturing applicant fingerprints) 356, an ID card printer 358 and a bar code reader 360 through its external ports.

The all in one capture station 349 communicates with other computing devices via a network 360. Other networked devices include operator workstations (e.g., 362, 364, 366), which each share the all in one capture from the operator perspective. Additional networked devices include a local server 368, which stores data for local enrollment transactions, a central image server 370, which stores images and related applicant demographic and biometric data in files, and a legacy system 372, which generally refers to the identification document issuer's data processing system that manages applicant processing and applicant information. For instance, in the example document creation process outlined below, the legacy system stores applicant demographic information and is either polled by the workstation to get requested applicant data, or pushes the appropriate applicant data to the local server and/or workstation. This applicant data is then used to generate or renew identification documents in enrollment transactions performed in the workstations.

In a typical configuration, one or more workstations (362-366) are connected to the all in one capture station 349 via a network connection. Users of the workstations log on to the their systems, which include capture control software and BSD socket network communication software compatible with the all in one capture station. These users can enter or select any of a variety of commands via a capture station user interface. In response the socket interface packages these commands into packets and sends them to the counterpart socket interface on the all in one capture station computer. An example of the enrollment process will help illustrate the operation of the workstation and its interface with the all in one capture station.

Figure 16:
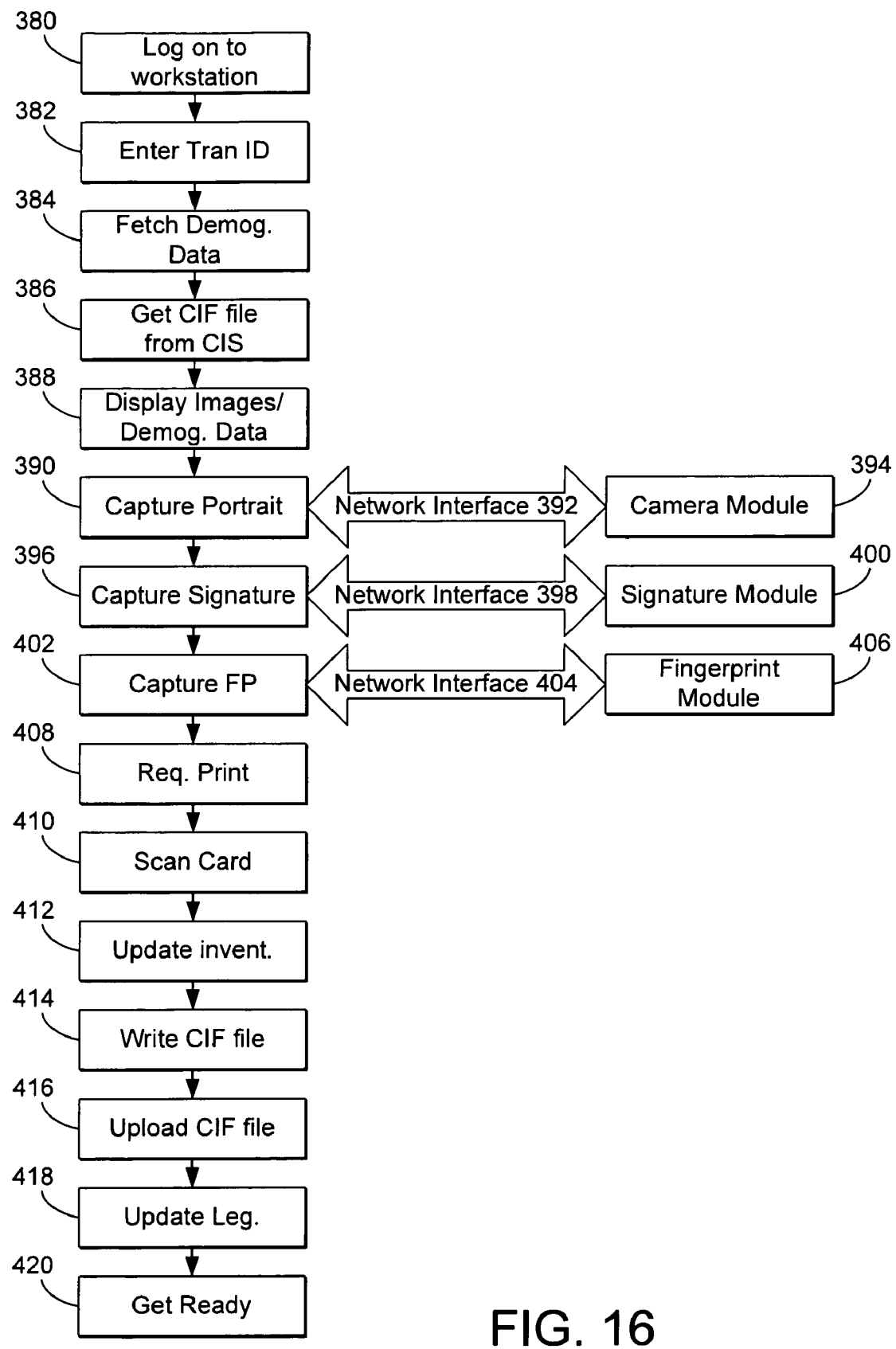
FIG. 16 is a flow diagram illustrating an example of a photo identification document enrollment process used with a capture station in accordance with one embodiment of the invention.

FIG. 16 is a flow diagram illustrating an example of the enrollment process in which a remote workstation controls the all in one capture station through its network interface. The workstation performs the process on the left, while the all in one capture station performs the process on the right in communication with the workstation.

The enrollment process begins when the operator logs onto the workstation (380). This may include biometric verification of the operator through a fingerprint capture station (e.g., either connected to the workstation or the all in one capture station).

At this stage, an enrollment application program, including a user interface and variety of modules for controlling capture and communication with other networked devices are executing within memory of the workstation.

The user interface provides an input text box for entering a transaction identifier. This transaction identifier identifies the applicant to the system. The operator enters this transaction identifier as shown in step 382.

In response, the enrollment program fetches demographic data of the applicant associated with the identifier (assuming this is a previously enrolled applicant) (384). In particular, it queries the legacy system through a legacy system interface module, which looks up the demographic data associated with the identifier and returns it to the workstation. As noted, this demographic data may be pre-loaded onto the workstation or local server via a data polling or data push model in which transaction identifiers for planned enrollment transactions are used to pre-load the demographic data of applicants. This process, of course, is skipped for new applicants for whom no demographic data exists in the system.

Next, the workstation fetches a file including the applicant's portrait and other applicant information (e.g., signature, fingerprint, etc.) from a central image server (386) through a image server interface. The user interface then populates a display window with the applicant's picture and demographic information, if available (388).

The workstation operator is now ready to capture the applicant's portrait. The operator has the applicant sit in front of the camera of the all in one capture station. The enrollment software in the workstation prepares the camera in the all in one capture station via the network interface between the workstation and capture station. When the enrollment program calls cameral control functions in the camera programming interface, it identifies the destination all in one capture station. This interface, in turn, sets up a socket connection with its counterpart on the all in one capture station. Once this communication link is established, the workstation controls the camera in the all in one capture device via the network interface. The camera feeds video back to camera control software on the capture station, which in turn, forwards it back to the enrollment program on the workstation via the socket. The workstation's user interface then displays the live video from the camera in a window next to a collection of windows/text boxes displaying applicant's old portrait and other demographic information.

Next, the operator has the ability to capture a particular image via an input control on the workstation (390). In this example, the operator presses the spacebar to capture the applicant's portrait. The camera module then captures a single frame from the video feed and passes it to the enrollment program, which displays it in the window, which previously showed the live video feed. Alternatively, still image capture of the applicant photo and the video feed of the applicant are performed separately, and the data and commands for video and still image capture are communicated separately. The video feed enables the operator to view the applicant, and compare the applicant with any photos on file for that applicant. It also enables the operator to ensure that the applicant is in the correct position before capturing a still image for use in the identification document.

This process of image capture can be repeated if necessary. As shown in FIG. 13, the enrollment program (and specifically its camera control module in the workstation) controls the process of setting up a connection with the capture device, returning video, and finally, capturing a single portrait through the network interface 392 and the camera control module 394 executing in the all in one capture station.

The enrollment process then repeats a similar procedure to capture the applicant's signature and fingerprint (396, 402). In particular, a signature module on the workstation receives a request from the enrollment program to capture a signature (396). In response, it sets up the socket interface 398 and passes the request to the signature module 400 on the all in one capture station, which captures the signature and returns it via the socket to the enrollment program on the workstation.

The fingerprint module on the workstation receives a request from the enrollment program to capture a fingerprint (402). In response, it sets up the socket interface 404 and passes the request to the fingerprint capture module 406 on the all in one capture station, which captures the fingerprint and returns it via the socket to the enrollment program on the workstation.

Now that the enrollment program has captured all of the data for the identification card, it sends a request to a rendering program to render and print the card (408). The rendering program packages and transforms the data, including the photo, signature, and possibly the fingerprint, into a printable image format. This may include invoking still other programs to generate various machine-readable features, such as 2D bar code and digital watermark (e.g., for embedding in the card's photo and background), and return printable versions of these features. Ultimately, the rendering program issues a request to the printer driver of an over the counter card printer to print the card.

The operator then gives the card to the applicant for inspection and verification of the accuracy of the data. If it's accurate and complete, the operator initiates a series of steps to complete the enrollment process. These include, for example, scanning the card with an image reader (410) to capture an image record of the card and to extract machine readable data from the card, such as the 2D bar code and digital watermark.

At this point, the enrollment program writes a new image file with the card portrait and related information (e.g., bar code, signature, fingerprint, etc.) as shown in step 414. It then uploads the file to the central image server via a image server interface (416). Now that the enrollment transaction is complete, it also update's the issuer's legacy system with the demographic and other card transaction information (418). The workstation now gets ready for the next applicant (420) (e.g., by destroying data structures created in the enrollment process and initializing new ones, etc.).

While we have used a specific example to illustrate the operation of the all in one capture station, the actual enrollment process can vary significantly. Cards need not be issued over the counter, but instead, can be issued from a central location, where cards are printed and mailed. The capture station uses a socket interface, but other forms of network interfaces may be used.

The capture station has been described in network operation mode, but it can also operate in a stand alone mode. As noted, the operator can simply plug in a video display and keyboard and then operate the capture station as a self contained card enrollment and issuing system. Alternatively, the capture station can be controlled by a portable computing device such as a Pocket PC, PDA or PC tablet via a wireless connection.

There are a variety of alternative ways to implement the enrollment program and its interface. One way is to implement the user interface of the enrollment program as a collection of web pages, and the core software and modules of the enrollment process as a web server application program, such as an Apache web server. In one particular embodiment for the all in one capture station, this web server executes on the all in one capture station. The web page interface (e.g., HTML coding) executes in a browser session, all running on a client device, such as a portable computer, PDA or PC tablet, connected via wireless (e.g., 802.11) or wired network connection to the all in one capture station.

In capture station embodiments described above, the capture devices are accessed via a network connection (Ethernet, for example) rather than being directly attached to the computer through an interface such as a serial, USB, parallel, SCSI, PCMCIA or FireWire interface to name a few. One advantage of the network accessible devices is that a workstation can attach to any capture device in an office providing more flexibility and reliability in the office environment.

One possible design of these capture systems is to have all of the capture actions controlled directly by a separate workstation computer connected to the networked capture station. In this design model, all captured images are initially downloaded to the separate enrollment workstation computer for printing or later transfer to a central image server or central image store.

The network camera tower described above includes the ability to network many traditional peripherals (as noted above) through the camera tower via a network link to multiple workstations. This basic system uses the same design model of transferring all images to the workstation before being uploaded to a central image server or central image store.

Another approach is to execute an application on the capture station that provides external workstations (including notebook computers, palm computers, PDA, tablet, etc.) a pure web based interface to the capture device. In this approach, the only data transferred from the camera tower to the attached enrollment workstation (in normal operation) is the, normally low resolution preview images of the captured images. The high resolution images are stored temporarily within the storage of the camera tower itself. Web forms provided by the capture system permit any attached device to upload any necessary text, image, and demographic information to the camera tower for association with the newly captured record. For security reasons, none of the newly captured high resolution images are transferred to the attached enrollment workstation or web based computer.

In this model, the captured images are combined with demographics uploaded from the web based workstation and the group of files (or combined archive files) are transferred directly from the networked camera tower to one or more central image storage locations. The transfers would be configurable to be via any of a number of commonly used network transport agents, including, but not limited to:

A mail transport agent (sending captured image via email)
FTP
.NET
Sun RPC
XML-RPC This model of capture allows an insecure capture station to perform all of the tasks necessary to capture identification information while never having access to the actual identification information. Lower cost, thin client and palm based capture solutions implementing secure transfers become possible. Additionally, the captured information can be transferred securely (encrypted) to multiple destinations without enrollment workstation intervention for higher reliability and redundancy.

In this model, the capture system has three principal components: 1. enrollment workstation; 2. capture station; and 3. secure data repository or server ("secure data system"). The enrollment workstation and capture station communicate via a first communication channel. The capture station and secure data system communicate via a second communication channel, which is preferably a secure channel.

The first channel need not be secure. It provides a communication channel for the enrollment workstation to send a limited set of commands to the capture station in response to enrollment operator input. The data from the enrollment workstation to the capture station is limited to basic commands such as: "take a picture", "send a preview of the picture", and "send data to the secure data system". The data sent from the capture station to the enrollment workstation is limited such that secure applicant data, such as the high resolution images captured of an applicant's face, fingerprint, iris/retinal scan, etc. is not sent to, nor available to the enrollment workstation. Instead, only limited data needed to facilitate accurate capture is sent from the capture station to the enrollment workstation, such as a low resolution facial image of the applicant (e.g., the preview image).

To reduce opportunities for interference with the secure channel, the capture station is configured such that enrollment workstations are only allowed to connect to it through restricted ports (e.g., ports that only allow access from authenticated enrollment workstations). A firewall may be implemented on the capture station to prevent unrestricted access and unauthorized data transfer between the enrollment and capture stations. Further, bio logins and password restricted access may be used to limit access to the capture station.

The secure data captured from an applicant (facial and other biometric data) is temporarily stored on the capture station in a secure format. In particular, it is stored in an encrypted and digitally signed format according to cryptographic protocols, such as PKI, 3DES, or AES. This applicant data is removed after it is sent to the secure data system. Preferably, the data is removed from temporary storage on the capture station after it is sent to the secure data system and a confirmation is received from the secure data system indicating that the data has been received and authenticated as being from a valid source and as being unmodified. Digital certificates and signatures may be used to authenticate the source and data integrity, respectively.

The communication channel between the secure data system and the capture station is secure. Secure data objects, such as facial images, biometric information and other applicant data, are encrypted and digitally signed. They are sent over a network connection via secure email protocol (encrypted and digitally signed), secure FTP (e.g., including encrypted and digitally signed file), and/or using secure protocols like SSH, secure sockets, etc.

Both the first and second communication channels may be implemented using web services interface, a Citrix portal, XML RPC, etc. As noted above, the capture station can execute a web server that communicates with a thin client on the enrollment workstation. In this case, the web server controls the interface establishing the limited control commands that the enrollment client can issue to the web server and the limited data (e.g., low resolution preview image) returned from the capture station to the enrollment client. Layers of security can be added to each communication channel as desired by using secure protocols like SSH, secure sockets, etc.

The secure data system can be implemented in a variety of configurations. In one configuration, it includes an image repository on a server. The server could be local to the enrollment workstation (e.g., on a LAN) or it can be remote (e.g., connected via WAN, Internet connection). It may be comprised of several devices for redundancy or for storing different aspects of the application data (e.g., different fingerprint, facial image, and signature databases). The capture station can be programmed to send the applicant data to multiple destinations (e.g., via secure email or FTP). Preferably, a transaction log of the secure data transmissions is kept by the capture station and secure data system. Suspicious transactions, e.g., ones involving failed login attempts or suspicious patterns of data transmission, can be flagged for operator investigation (e.g., by identifying the FTP file transfers or emails that are suspect) through an email of transmission events to a security administrator.

The secure data system processes the incoming secure objects. In one implementation, it is implemented as a Daemon (Unix process) executing on the image server. The image server receives incoming secure data objects and stores them in a directory. The objects are queued for handling by the Daemon. The Daemon authenticates the objects by checking their data integrity and source via the encryption protocol, which includes a digital signature of the data object. Once the validity of the data object and its source is confirmed, the server sends a confirmation receipt back to the enrollment workstation, which in response, removes the data object from its temporary storage.

Combining Shadow Reduction System with Capture Station

Figures 17A, 17B:
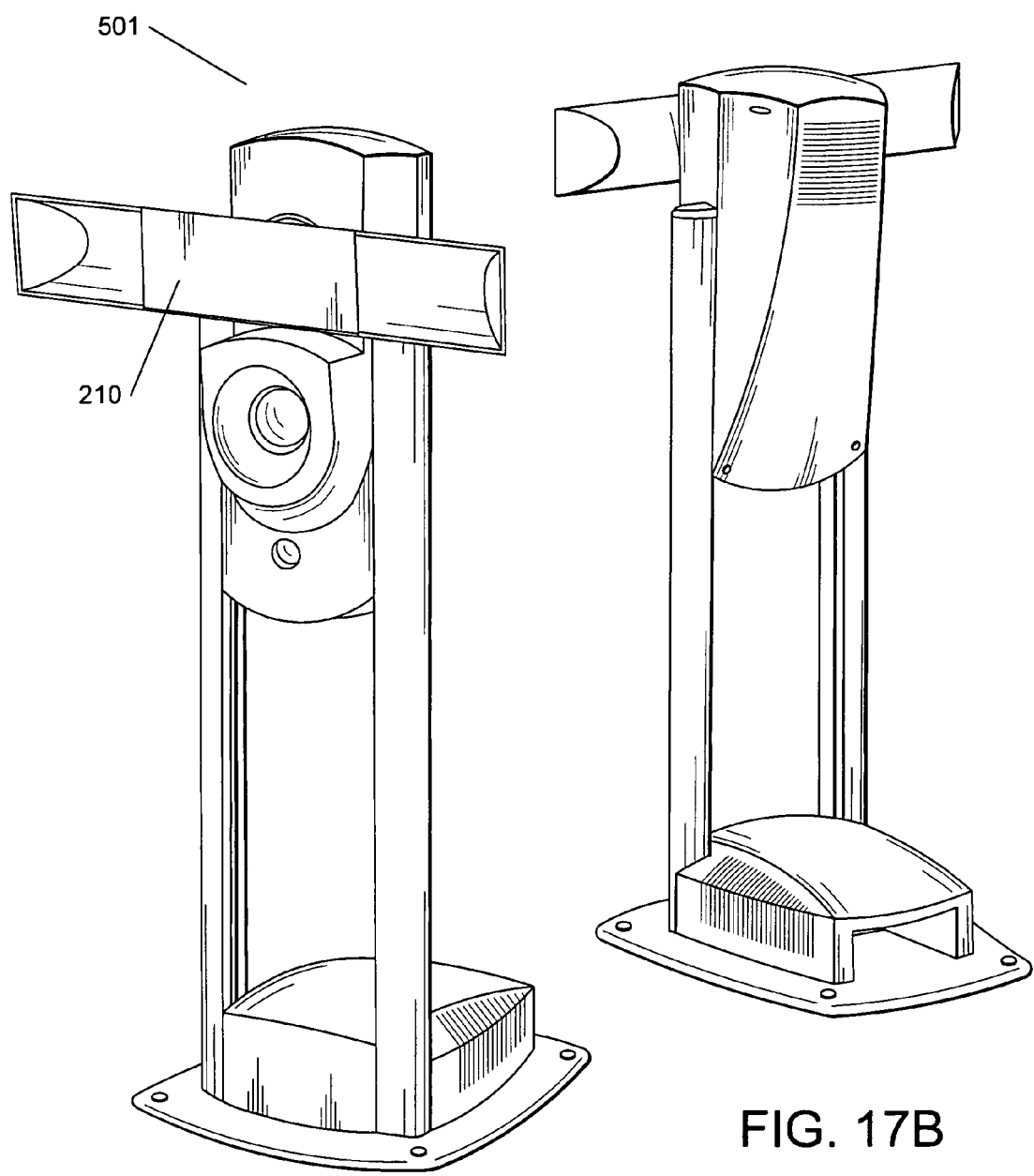
Figures 17C, 17D:
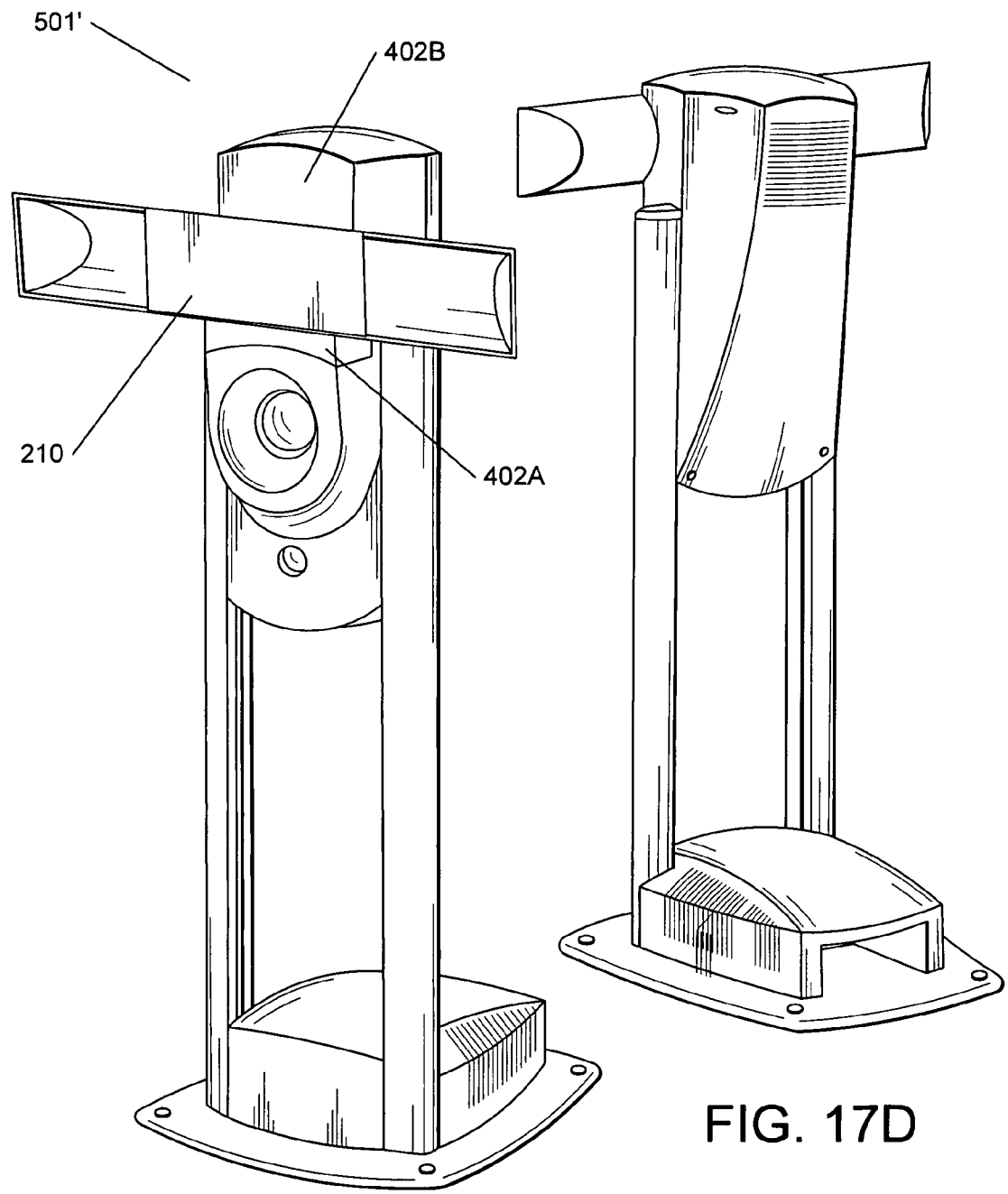
FIGS. 17C and 17D are front and rear perspective views, respectively, of a second capture station with a shadow reduction system, in accordance with a fourth embodiment of the invention.

FIGS. 17A and 17B are front and rear perspective views, respectively, of a first capture station with a shadow reduction system, in accordance with a third embodiment of the invention, and FIGS. 17C and 17D are front and rear perspective views, respectively, of a second capture station with a shadow reduction system, in accordance with a fourth embodiment of the invention. In these embodiments, we have coupled a shadow reduction system 210 (see FIG. 2) to the invention. The system of FIGS. 17A and 17B differs from the system of FIGS. 17C and 17D only in that in FIGS. 17C and 17D, a modified panel 402B is provided to more securely house the shadow reduction device.

Carrying the Capture Station

Figure 18A:
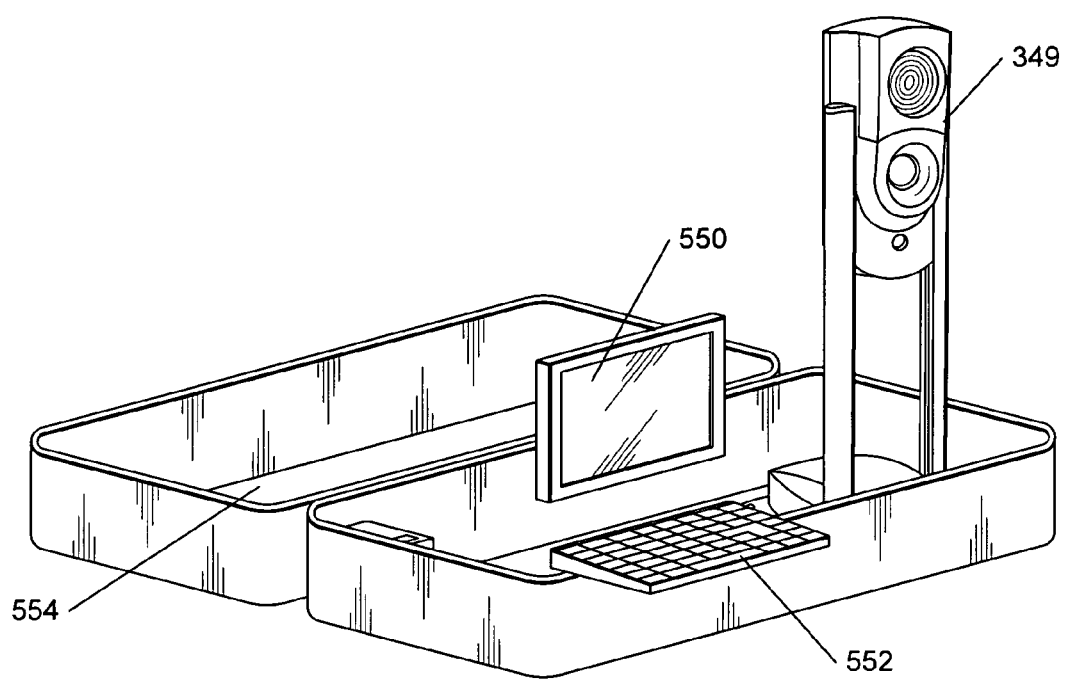
FIG. 18A is a front perspective view of a portable version of the capture station of FIG. 3A in an "open" position in its case, in accordance with an embodiment of the invention.
Figure 18B:
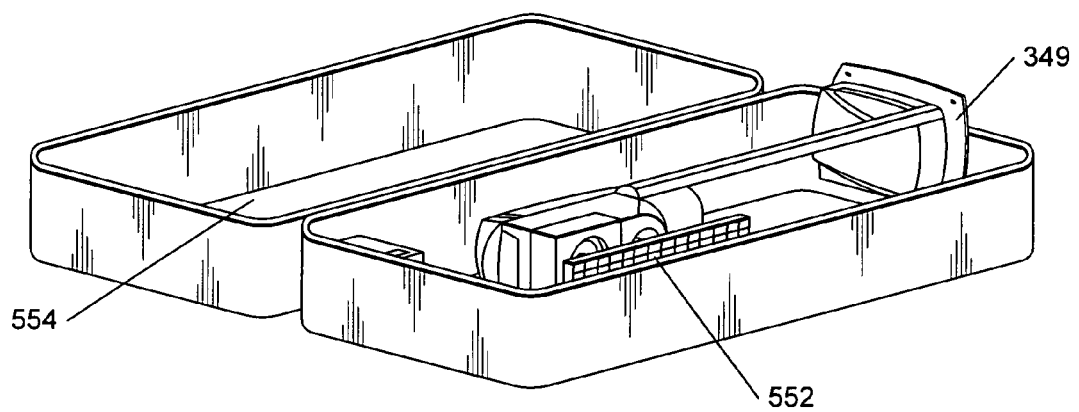
FIG. 18B is a front perspective view of the capture station and case of FIG. 18A in a partially closed position.

FIG. 18A is a front perspective view of a portable version of the capture station 349 of FIG. 3A in an "open" position in its case, together with an external display 550 and external keyboard 552, in accordance with an embodiment of the invention. FIG. 18B is a front perspective view of the capture station and case of FIG. 18A in a partially closed position. Of course, many other ways are possible to make the capture station 349 portable.

Other Designs for the Capture Station

Figure 19A:
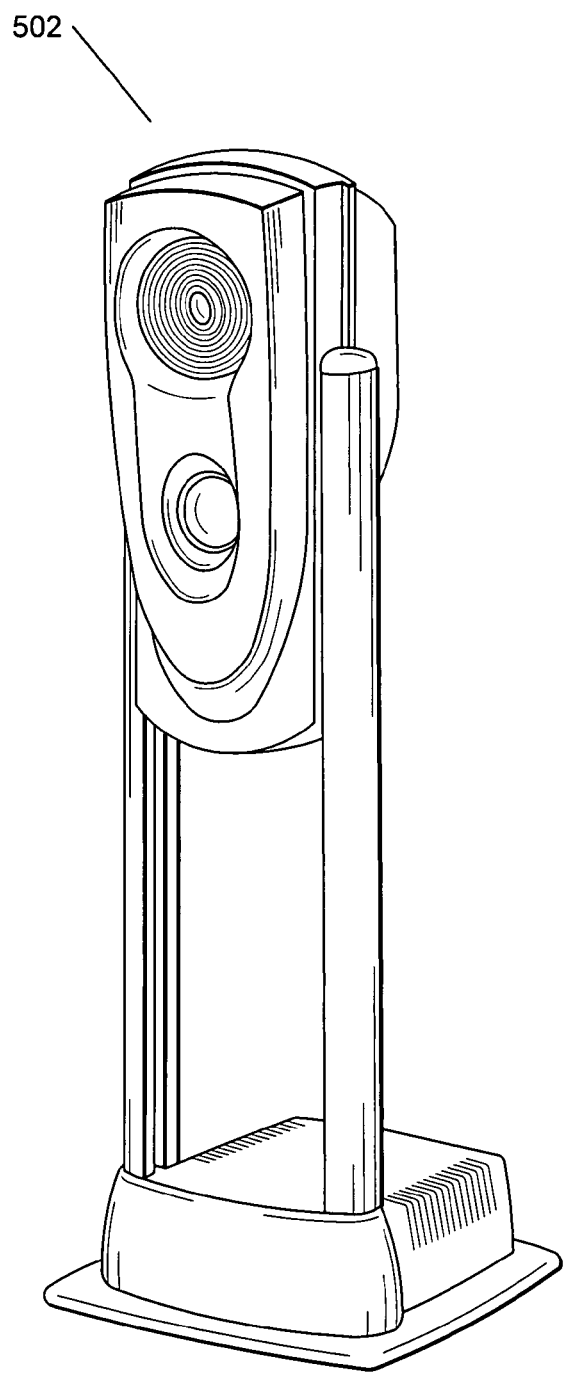
FIGS. 19A and 19B are front and back perspective views, respectively, of a capture station in accordance with a fifth embodiment of the invention.
Figure 19B:
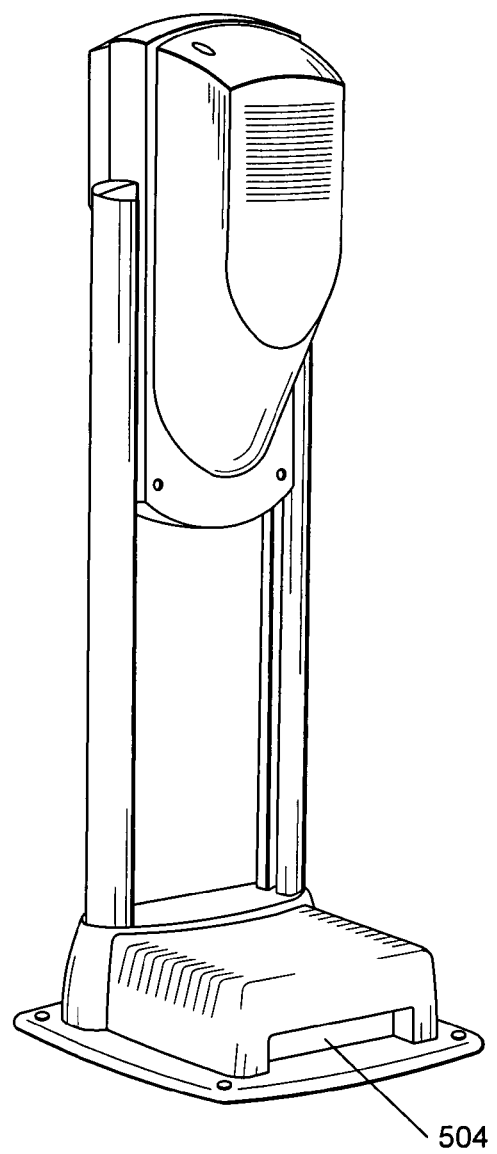
Figure 21C:
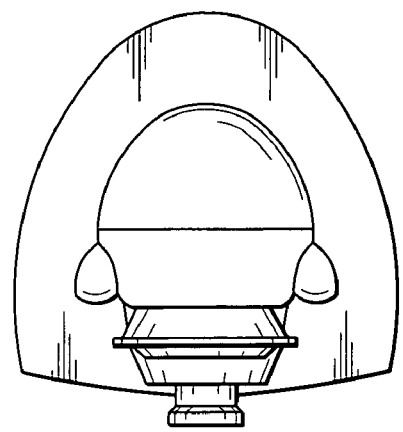
FIG. 21A-21C are front, side, and top views, respectively, of a seventh embodiment of the invention.
Figure 21A:
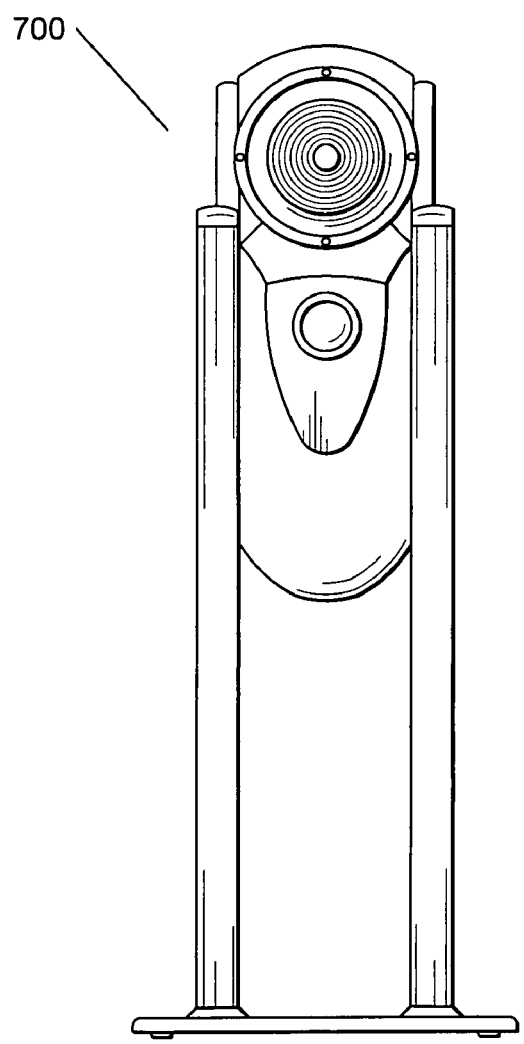
Figure 21B:
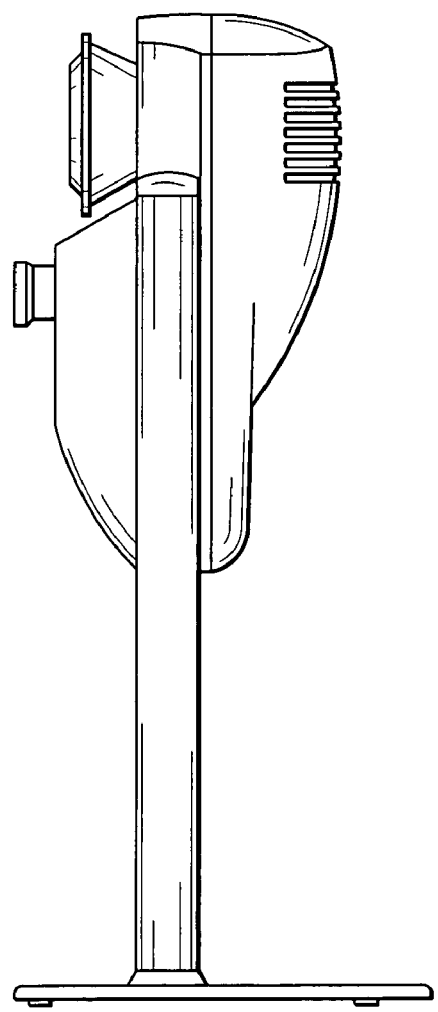
Figure 23C:
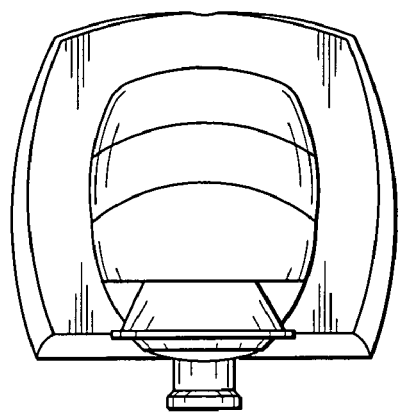
FIGS. 23A-23C are front, side, and top views, respectively, of a ninth embodiment of the invention.
Figure 23A:
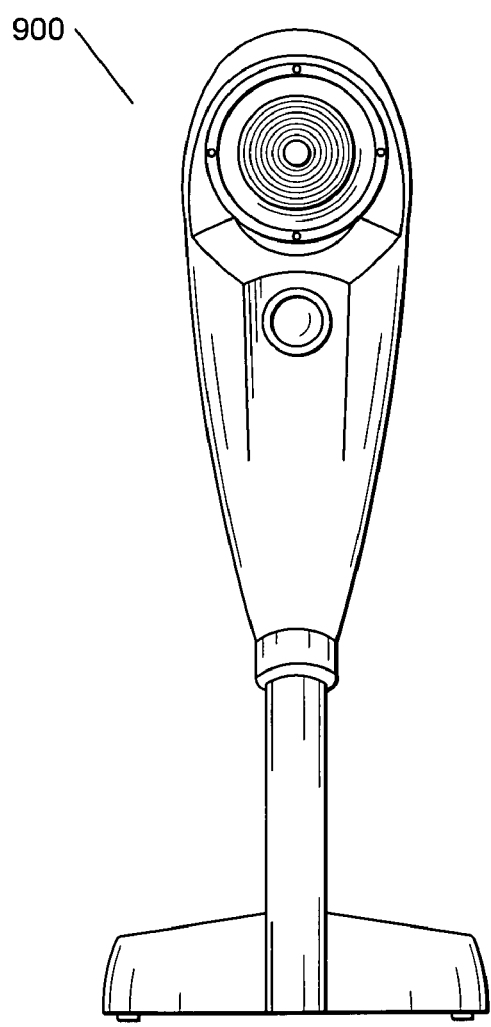
Figure 23B:
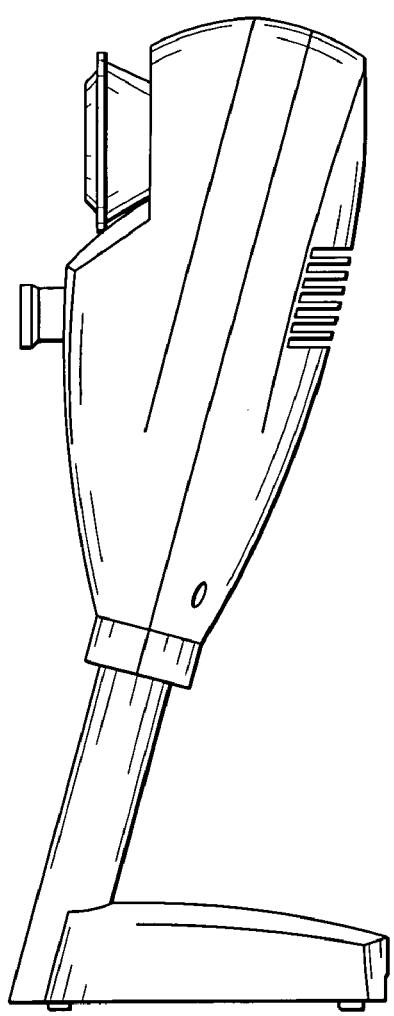
Figure 25C:
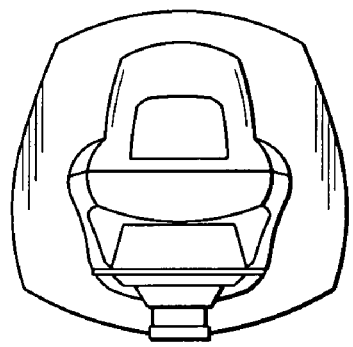
FIGS. 25A-25C are front, side, and top views, respectively, of a eleventh embodiment of the invention.
Figure 25A:
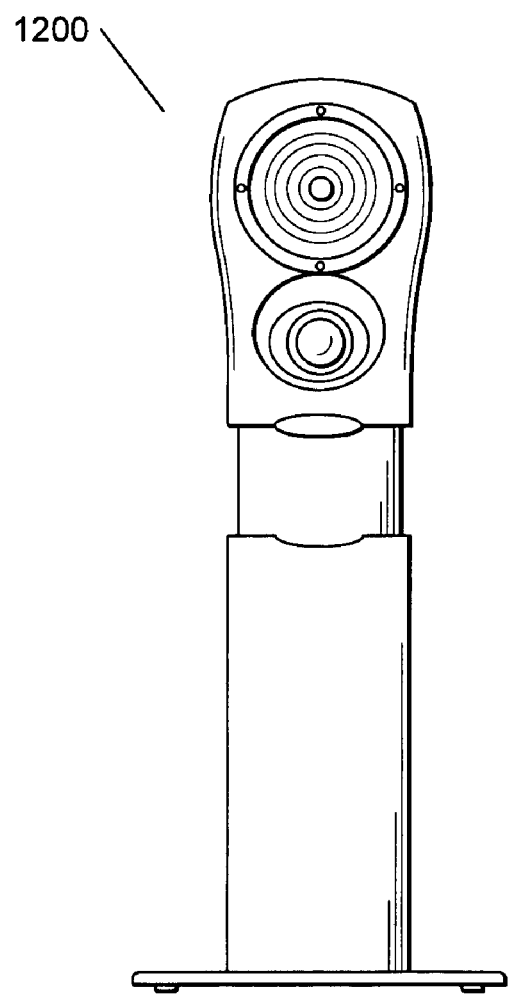
Figure 25B:
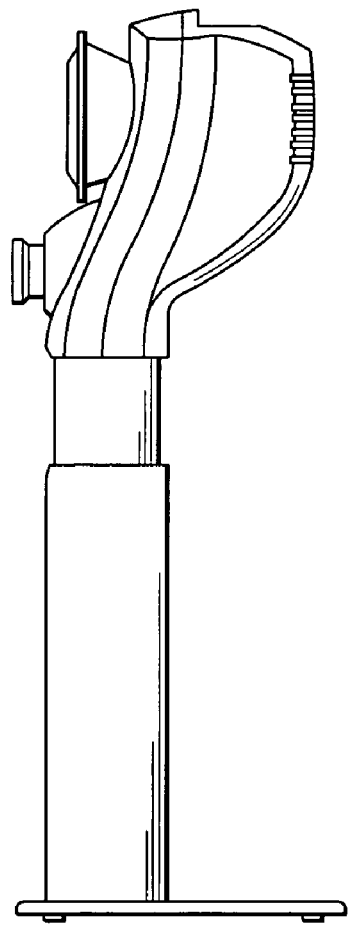
Figure 26C:
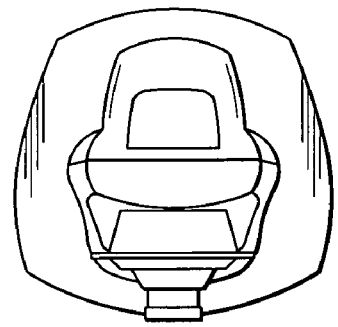
FIGS. 26A-26C are front, side, and top views, respectively, of a twelfth embodiment of the invention.
Figure 26A:
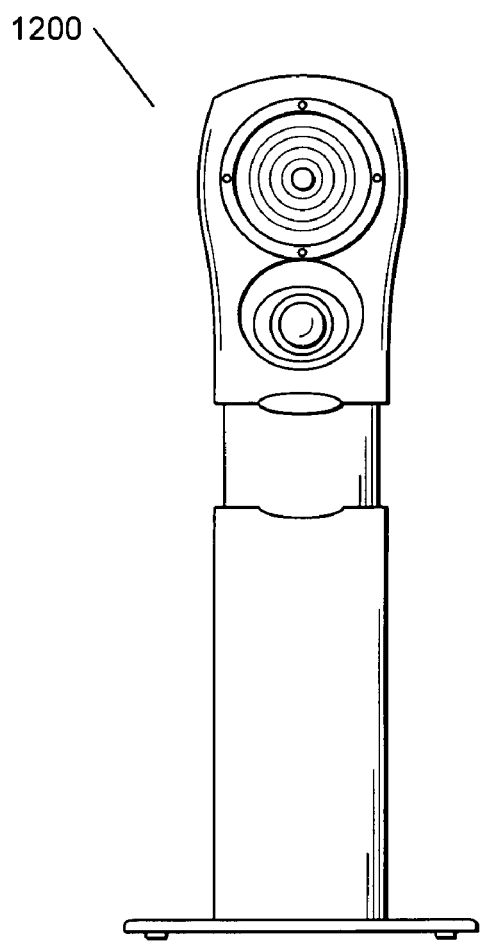
Figure 26B:
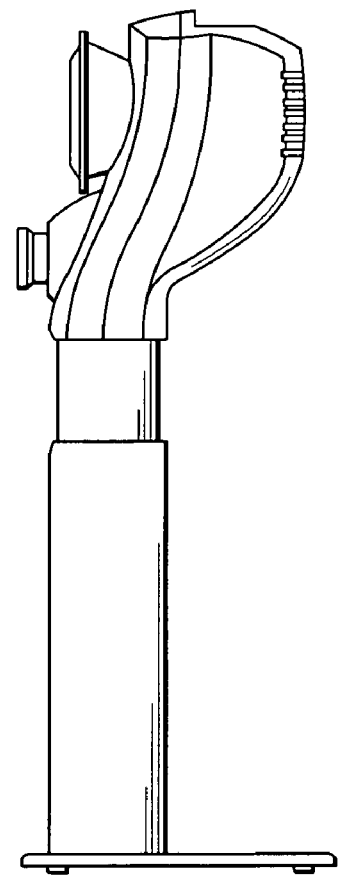

We have also developed numerous other configurations and designs of the capture station 349 that can be adapted to work with the functions described herein. FIGS. 13A and 13B, as well as FIGS. 19A through 26C, illustrate just a few of our designs. FIGS. 19A and 19B are front and back perspective views, respectively, of a capture station in accordance with a fifth embodiment of the invention. FIGS. 20A and 20B are front and back perspective views, respectively, of a capture station in accordance with a sixth embodiment of the invention. FIG. 21A-21C are front, side, and top views, respectively, of a seventh embodiment of the invention. FIG. 22A-22C are front, side, and top views, respectively, of an eighth embodiment of the invention. FIGS. 23A-23C are front, side, and top views, respectively, of a ninth embodiment of the invention. FIGS. 24A-24C are front, side, and top views, respectively, of a tenth embodiment of the invention. FIGS. 25A-25C are front, side, and top views, respectively, of a eleventh embodiment of the invention. FIGS. 26A-26C are front, side, and top views, respectively, of a twelfth embodiment of the invention.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use UV inks and/or dyes by way of example, the present invention is not so limited. Our inventive techniques and methods will improve the visibility and crispness of infrared and other fluorescing images as well. The inventive techniques and methods can improve the visibility and crispness of thermachromic inks and resins (i.e., inks and resins whose appearance changes and/or becomes visible with temperature changes). Moreover, our inventive techniques are useful for preprocessing images destined for ID documents using various printing processes including, but not limited to, dye infusion, mass-transfer, laser xerography, ink jet, wax transfer, variable dot transfer, and other printing methods by which a fluorescing image can be formed.

It should be appreciated that the methods described above, as well as the methods for implementing and embedding digital watermarks, can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software can be stored on a computer readable media, such as a diskette, removable media, DVD, CD, hard drive, electronic memory circuit, etc.).

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced herein.

The technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption, etc.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

We claim:

1. A capture station for creating identification documents comprising:
    a housing configured to mount an integrated digital camera and lighting device, at least a portion of a front face of the housing defining an aperture sized and arranged to align with an opening of a lens of the camera, at least a portion of the housing surrounding the aperture and being shaped to protect the camera lens;
    a base including a processor device and a memory device, the processor device configured to execute instructions received from the memory device;
    and two or more substantially parallel elongated legs extending from the base, at least two of the legs each defining a channel extending along at least a portion of the leg and open to an area external to the interior of the leg, the at least two legs further defining a plurality of openings spaced along at least a portion of the legs to serve as points of attachment of the housing in the channels, the housing being positioned in the space between the legs and adjustably mounted in one or more openings in the channels of the at least two legs to enable a height adjustment of the camera, at least one channel further configured to receive at least a portion of one or more wires that operatively couple the processor in the base to the camera within the housing and/or to one or more peripheral devices, the housing further defining along a side surface at least one routing opening positioned and sized to align and mate with an upper portion of the at least one channel when the housing and the respective leg are assembled, such that, the routing opening receives at least a portion of each of the one or more wires to permit operative connection to the camera and/or one or more peripheral devices.

2. The capture station of claim 1 wherein the memory includes a network interface for enabling remote control of the camera via a remote computer in communication with the processor via a network connection.

3. The capture station of claim 2 wherein the processor comprises an embedded controller.

4. The capture station of claim 1 including a peripheral mounted to at least one of the legs.

5. The capture station of claim 4 wherein the peripheral is slidably mounted to at least one leg to enable a user to mount the peripheral at a desired height above the base.

6. The capture station of claim 4 wherein the peripheral is mounted to at least one leg via a clamp.

7. The capture station of claim 6 wherein the clamp is height adjustable on at least one leg to enable a user to mount the peripheral on at least one leg at a desired height above the base.

8. The capture station of claim 4 wherein the peripheral comprises a display.

9. The capture station of claim 8 wherein the display is operable to display images captured by the camera as they are being captured, enabling a subject to review an image for use on an identification document created using data captured by the capture station.

10. The capture station of claim 4 wherein at least one leg enables a plurality of peripherals to be suspended above a working surface upon which the base rests.

11. The capture station of claim 4 wherein at least one leg includes a channel configured to receive at least a portion of one or more wires that operatively couple the peripheral to the processor device for controlling the camera and the peripheral.

12. The capture station of claim 1 wherein the processor device executes instructions for finding and aligning a face within an image to prepare the image for printing on an identification document.

13. The capture station of claim 1 including a shadow reduction system mounted to the housing, the shadow reduction system including diffusely reflective surface for directing light to a subject's face to reduce shadows on the subjects face.

14. A capture station for use in capturing data for an identification document, the station comprising:
    a camera stand comprising a base, housing and at least one elongated member;
    the housing including an integrated digital camera and lighting device, at least a portion of a front face of the housing defining an aperture sized and arranged to align with an opening of a lens of the camera, at least a portion of the housing surrounding the aperture and being shaped to protect the camera lens;
    the at least one elongated member extending upward from the base and defining a channel extending at least a portion of the elongated member and open to an area external to the interior of the member, the member further defining a plurality of openings spaced along at least a portion of the elongated member to serve as points of attachment of the housing and for adjustably supporting the housing and at least one peripheral at a desired height above the base, the channel configured to receive at least a portion of one or more wires that operatively couple a computer, integrated into the base, to the digital camera and/or the at least one peripheral device;
    the computer including a processor, network interface device, and memory, the memory storing a camera control program and a network interface program for transferring camera control commands and image data between the capture station and a remote workstation so that the capture station can operate under the control of the remote workstation to capture data for incorporation into an identification document; and
    the housing further defining at least one routing opening positioned and sized to align and mate with an upper portion of the at least one channel when the housing and the at least one member are assembled, such that, the routing opening receives at least a portion of each of the one or more wires to permit operative connection to the camera and/or the at least one peripheral device.

15. A capture station comprising:

a camera stand, a digital camera mounted within the camera stand and integrated with a lighting system, the camera stand having one or more elongated support members to which a capture element can be fixedly coupled, the one or more elongated support members each defining a channel extending at least a portion of the elongated support member, at least one channel being open to an area external to the interior of the member, the at least one channel configured to receive at least a portion of one or more wires that operatively couple the camera and the capture element;

the camera stand further including a housing for containing the digital camera and the lighting system;

the one or more elongated support members further defining a plurality of openings spaced along at least a portion of the elongated support members to serve as points of attachment of the housing in the channels and for adjustably mounting the housing in one or more openings and to enable a height adjustment of the camera; and the housing defining at least one routing opening positioned and sized to align and mate with an upper portion of the at least one channel when the housing and the respective member are connected, such that, the routing opening receives a portion of each of the one or more wires.

16. The capture station of claim 15 including a computer, the computer including a processor, network interface device, and memory, the memory storing a camera control program and a network interface program for transferring camera control commands and image data between the capture station and a remote workstation so that the capture station can operate under the control of the remote workstation to capture data for incorporation into an identification document, the computer operatively coupled to the digital camera through the one or more wires within the at least one channel.

17. The capture station of claim 16 wherein the computer executes instructions for finding a face in an image and aligning the face within the image.

\* \* \* \* \*

UNITED STATES PATENT AND TRADEMARK OFFICE
CERTIFICATE OF CORRECTION

PATENT NO. : 7,646,425 B2  Page 1 of 1
APPLICATION NO. : 11/112965
DATED : January 12, 2010
INVENTOR(S) : Bohaker et al.

It is certified that error appears in the above-identified patent and that said Letters Patent is hereby corrected as shown below:

On the Title page,

[*] Notice:   Subject to any disclaimer, the term of this patent is extended or adjusted under 35 U.S.C. 154(b) by 403 days.

Delete the phrase "by 403 days" and insert -- by 643 days --

Signed and Sealed this

Thirteenth Day of July, 2010

David J. Kappos
*Director of the United States Patent and Trademark Office*